US008651928B2

(12) United States Patent
Bansemer et al.

(10) Patent No.: US 8,651,928 B2
(45) **Date of Patent: *Feb. 18, 2014**

(54) CENTRAL DETERMINATION SYMBOL GAME

(71) Applicant: IGT, Reno, NV (US)

(72) Inventors: Mark W. Bansemer, Reno, NV (US); Bryan D. Wolf, Reno, NV (US); Christopher T. Brune, Carson City, NV (US); Anthony J. Baerlocher, Henderson, NV (US); John M. Montross, Reno, NV (US)

(73) Assignee: IGT, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/773,003

(22) Filed: Feb. 21, 2013

(65) Prior Publication Data

US 2013/0172064 A1 Jul. 4, 2013

Related U.S. Application Data

(63) Continuation of application No. 12/407,545, filed on Mar. 19, 2009, now Pat. No. 8,398,472, which is a continuation of application No. 10/945,642, filed on Sep. 21, 2004, now Pat. No. 7,524,243.

(51) Int. Cl.
*A63F 13/00* (2006.01)
*A63F 9/24* (2006.01)

(52) U.S. Cl.
USPC .................. 463/10; 463/12; 463/13; 463/21; 463/25

(58) Field of Classification Search
USPC ............. 463/12, 13, 16–22, 25; 273/292, 307
See application file for complete search history.

(56) References Cited

U.S. PATENT DOCUMENTS 4,157,829 A 6/1979 Goldman et al.
4,332,389 A 6/1982 Loyd et al.
4,335,809 A 6/1982 Wain
4,339,798 A 7/1982 Hedges et al.

(Continued)

FOREIGN PATENT DOCUMENTS

WO WO 02/097749 12/2002

OTHER PUBLICATIONS

Diamonopoly Advertisement by International Gamco, Inc., published 2002.

(Continued)

*Primary Examiner* — David L Lewis
*Assistant Examiner* — Robert Mosser
(74) *Attorney, Agent, or Firm* — Neal, Gerber & Eisenberg LLP

(57) ABSTRACT

A plurality of symbols are provided to a player wherein one or more of the provided symbols are based on the predetermined game outcome. The player is enabled to select one or more of the initially dealt symbols to hold. If a symbol combination with an associated payout equal to the value associated with the predetermined game outcome may be obtained based on the held cards, the gaming device utilizes one or more backfill algorithms, to determine which card or cards, if any, need to be dealt to the player. The determined cards are provided to the player to replace the symbols designated by the player not to hold and the selected predetermined game outcome which is associated with a value equal to the payout of the player's symbol combination is provided to the player.

19 Claims, 13 Drawing Sheets

(56) References Cited

U.S. PATENT DOCUMENTS

| | | | |
|---|---|---|---|
| 4,365,810 | A | 12/1982 | Richardson |
| 4,373,726 | A | 2/1983 | Churchill et al. |
| 4,448,419 | A | 5/1984 | Telnaes |
| 4,455,025 | A | 6/1984 | Itkis |
| 4,467,424 | A | 8/1984 | Hedges et al. |
| 4,494,197 | A | 1/1985 | Troy et al. |
| 4,527,798 | A | 7/1985 | Siekierski et al. |
| 4,560,161 | A | 12/1985 | Hamano |
| 4,582,324 | A | 4/1986 | Koza et al. |
| 4,624,462 | A | 11/1986 | Itkis |
| 4,636,951 | A | 1/1987 | Harlick |
| 4,652,998 | A | 3/1987 | Koza et al. |
| 4,669,730 | A | 6/1987 | Small |
| 4,679,143 | A | 7/1987 | Hagiwara |
| 4,689,742 | A | 8/1987 | Troy et al. |
| 4,798,387 | A | 1/1989 | Richardson |
| 4,805,907 | A | 2/1989 | Hagiwara |
| 4,815,741 | A | 3/1989 | Small |
| 4,817,951 | A | 4/1989 | Crouch et al. |
| 4,842,278 | A | 6/1989 | Markowicz |
| 4,848,771 | A | 7/1989 | Richardson |
| 4,856,787 | A | 8/1989 | Itkis |
| 4,880,237 | A | 11/1989 | Kishishita |
| 4,882,473 | A | 11/1989 | Bergeron et al. |
| 4,982,337 | A | 1/1991 | Burr et al. |
| 5,007,649 | A | 4/1991 | Richardson |
| 5,042,809 | A | 8/1991 | Richardson |
| 5,092,598 | A | 3/1992 | Kamille |
| 5,119,295 | A | 6/1992 | Kapur |
| 5,158,293 | A | 10/1992 | Mullins |
| 5,223,698 | A | 6/1993 | Kapur |
| 5,265,874 | A | 11/1993 | Dickinson et al. |
| 5,275,400 | A | 1/1994 | Weingardt et al. |
| 5,276,312 | A | 1/1994 | McCarthy |
| 5,282,620 | A | 2/1994 | Keesee |
| 5,297,802 | A | 3/1994 | Pocock et al. |
| 5,324,035 | A | 6/1994 | Morris et al. |
| 5,326,104 | A | 7/1994 | Pease et al. |
| 5,348,299 | A | 9/1994 | Clapper, Jr. |
| 5,351,970 | A | 10/1994 | Fioretti |
| 5,377,975 | A | 1/1995 | Clapper, Jr. |
| 5,393,057 | A | 2/1995 | Marnell |
| 5,393,061 | A | 2/1995 | Manship et al. |
| 5,398,932 | A | 3/1995 | Eberhardt et al. |
| 5,407,199 | A | 4/1995 | Gumina |
| 5,476,259 | A | 12/1995 | Weingardt |
| 5,487,544 | A | 1/1996 | Clapper, Jr. |
| 5,536,008 | A | 7/1996 | Clapper, Jr. |
| 5,542,669 | A | 8/1996 | Charron et al. |
| 5,562,284 | A | 10/1996 | Stevens |
| 5,564,701 | A | 10/1996 | Dettor |
| 5,580,311 | A | 12/1996 | Haste, III |
| 5,595,538 | A | 1/1997 | Haste, III |
| 5,609,337 | A | 3/1997 | Clapper, Jr. |
| 5,628,684 | A | 5/1997 | Boudec |
| 5,630,754 | A | 5/1997 | Rebane |
| 5,639,088 | A | 6/1997 | Schneider et al. |
| 5,645,485 | A | 7/1997 | Clapper, Jr. |
| 5,657,899 | A | 8/1997 | Stoken |
| 5,674,128 | A | 10/1997 | Holch et al. |
| 5,697,843 | A | 12/1997 | Manship et al. |
| 5,720,483 | A | 2/1998 | Trinh |
| 5,735,432 | A | 4/1998 | Stoken et al. |
| 5,749,784 | A | 5/1998 | Clapper, Jr. |
| 5,779,545 | A | 7/1998 | Berg et al. |
| 5,779,547 | A | 7/1998 | SoRelle et al. |
| 5,800,269 | A | 9/1998 | Holch et al. |
| 5,810,664 | A | 9/1998 | Clapper, Jr. |
| 5,830,067 | A | 11/1998 | Graves et al. |
| 5,855,515 | A | 1/1999 | Pease et al. |
| 5,871,398 | A | 2/1999 | Schneier et al. |
| 5,876,283 | A | 3/1999 | Parra et al. |
| 5,882,260 | A | 3/1999 | Marks et al. |
| 5,915,588 | A | 6/1999 | Stoken et al. |
| 5,928,082 | A | 7/1999 | Clapper, Jr. |
| 5,941,771 | A | 8/1999 | Haste, III |
| 5,944,606 | A | 8/1999 | Gerow |
| 5,949,042 | A | 9/1999 | Dietz, II et al. |
| 5,954,582 | A | 9/1999 | Zach |
| 5,980,385 | A | 11/1999 | Clapper, Jr. |
| 5,984,779 | A | 11/1999 | Bridgeman et al. |
| 6,012,984 | A | 1/2000 | Roseman |
| 6,017,032 | A | 1/2000 | Grippo et al. |
| 6,024,640 | A | 2/2000 | Walker et al. |
| 6,056,289 | A | 5/2000 | Clapper, Jr. |
| 6,062,981 | A | 5/2000 | Luciano, Jr. |
| 6,089,982 | A | 7/2000 | Holch et al. |
| 6,093,100 | A | 7/2000 | Singer et al. |
| 6,120,024 | A | 9/2000 | Lind |
| 6,132,311 | A | 10/2000 | Williams |
| 6,146,271 | A | 11/2000 | Kadlic |
| 6,146,272 | A | 11/2000 | Walker et al. |
| 6,149,521 | A | 11/2000 | Sanduski |
| 6,155,925 | A | 12/2000 | Giobbi et al. |
| 6,159,095 | A | 12/2000 | Frohm et al. |
| 6,168,521 | B1 | 1/2001 | Luciano et al. |
| 6,174,233 | B1 | 1/2001 | Sunaga et al. |
| 6,183,361 | B1 | 2/2001 | Cummings et al. |
| 6,190,255 | B1 | 2/2001 | Thomas et al. |
| 6,210,275 | B1 | 4/2001 | Olsen |
| 6,210,276 | B1 | 4/2001 | Mullins |
| 6,217,448 | B1 | 4/2001 | Olsen |
| 6,220,961 | B1 | 4/2001 | Keane et al. |
| 6,241,606 | B1 | 6/2001 | Riendeau et al. |
| 6,251,013 | B1 | 6/2001 | Bennett |
| 6,254,480 | B1 | 7/2001 | Zach |
| 6,273,820 | B1 | 8/2001 | Haste, III |
| 6,280,325 | B1 | 8/2001 | Fisk |
| 6,280,328 | B1 | 8/2001 | Holch et al. |
| 6,302,791 | B1 | 10/2001 | Frohm et al. |
| 6,306,038 | B1 | 10/2001 | Graves et al. |
| 6,309,298 | B1 | 10/2001 | Gerow |
| 6,315,289 | B1 | 11/2001 | Sakamoto et al. |
| 6,322,445 | B1 | 11/2001 | Miller |
| 6,325,716 | B1 | 12/2001 | Walker et al. |
| 6,358,150 | B1 | 3/2002 | Mir et al. |
| 6,358,151 | B1 | 3/2002 | Enzminger et al. |
| 6,368,218 | B2 | 4/2002 | Angell, Jr. |
| 6,386,977 | B1 | 5/2002 | Hole |
| 6,402,614 | B1 | 6/2002 | Schneier et al. |
| 6,419,583 | B1 | 7/2002 | Crumby et al. |
| 6,425,824 | B1 | 7/2002 | Baerlocher et al. |
| 6,447,395 | B1 | 9/2002 | Stevens |
| 6,450,885 | B2 | 9/2002 | Schneier et al. |
| 6,454,648 | B1 | 9/2002 | Kelly et al. |
| RE37,885 | E | 10/2002 | Acres et al. |
| 6,471,591 | B1 | 10/2002 | Crumby |
| 6,474,645 | B2 | 11/2002 | Tarantino |
| 6,475,086 | B2 | 11/2002 | Zach |
| 6,485,366 | B1 | 11/2002 | Rowe |
| 6,508,711 | B1 | 1/2003 | Ono |
| 6,524,184 | B1 | 2/2003 | Lind et al. |
| 6,524,185 | B2 | 2/2003 | Lind |
| 6,527,638 | B1 | 3/2003 | Walker et al. |
| 6,533,664 | B1 | 3/2003 | Crumby |
| 6,537,150 | B1 | 3/2003 | Luciano et al. |
| 6,569,017 | B2 | 5/2003 | Enzminger et al. |
| 6,599,187 | B2 | 7/2003 | Gerow |
| 6,607,439 | B2 | 8/2003 | Schneier et al. |
| 6,609,974 | B2 | 8/2003 | Mead et al. |
| 6,619,660 | B2 | 9/2003 | Schaefer et al. |
| 6,656,040 | B1 | 12/2003 | Brosnan et al. |
| 6,656,044 | B1 | 12/2003 | Lewis |
| 6,676,126 | B1 | 1/2004 | Walker et al. |
| 6,685,562 | B1 | 2/2004 | Rantanen |
| 6,695,695 | B2 | 2/2004 | Angel |
| 6,729,621 | B2 | 5/2004 | Moody |
| 6,729,961 | B1 | 5/2004 | Millerschone |
| 6,733,385 | B1 | 5/2004 | Enzminger et al. |
| 6,749,500 | B1 | 6/2004 | Nelson et al. |
| 6,964,609 | B2 | 11/2005 | Haag et al. |
| 7,022,016 | B2 | 4/2006 | Wood et al. |
| 7,387,568 | B2 | 6/2008 | Millerschone |
| 7,390,258 | B2 | 6/2008 | Millerschone |

(56) References Cited

U.S. PATENT DOCUMENTS

| | | | |
|---|---|---|---|
| 7,393,276 | B2 | 7/2008 | Millerschone |
| 7,470,183 | B2 | 12/2008 | Wishart |
| 7,559,838 | B2 | 7/2009 | Walker et al. |
| 2002/0010013 | A1 | 1/2002 | Walker et al. |
| 2002/0039917 | A1 | 4/2002 | Armstrong et al. |
| 2002/0077173 | A1 | 6/2002 | Luciano et al. |
| 2002/0077174 | A1 | 6/2002 | Luciano et al. |
| 2002/0082070 | A1 | 6/2002 | Macke et al. |
| 2002/0082071 | A1 | 6/2002 | Riendeau et al. |
| 2002/0082085 | A1 | 6/2002 | Osterer |
| 2002/0090986 | A1 | 7/2002 | Cote et al. |
| 2002/0094871 | A1 | 7/2002 | Luciano et al. |
| 2002/0098882 | A1 | 7/2002 | Lind et al. |
| 2002/0098883 | A1 | 7/2002 | Packes, Jr. et al. |
| 2002/0111207 | A1 | 8/2002 | Lind et al. |
| 2002/0111214 | A1 | 8/2002 | Lind et al. |
| 2002/0113369 | A1 | 8/2002 | Weingardt |
| 2002/0132661 | A1 | 9/2002 | Lind et al. |
| 2002/0132666 | A1 | 9/2002 | Lind et al. |
| 2002/0196342 | A1 | 12/2002 | Walker et al. |
| 2003/0060257 | A1 | 3/2003 | Katz et al. |
| 2003/0060261 | A1 | 3/2003 | Katz et al. |
| 2003/0060276 | A1 | 3/2003 | Walker et al. |
| 2003/0100371 | A1 | 5/2003 | Gatto et al. |
| 2003/0100372 | A1 | 5/2003 | Gatto et al. |
| 2003/0125101 | A1 | 7/2003 | Campo |
| 2003/0181231 | A1 | 9/2003 | Vancura et al. |
| 2003/0190943 | A1 | 10/2003 | Walker et al. |
| 2003/0211884 | A1 | 11/2003 | Gauselmann |
| 2004/0014515 | A1 | 1/2004 | Tracy et al. |
| 2004/0036212 | A1 | 2/2004 | Walker et al. |
| 2004/0038723 | A1 | 2/2004 | Schneier et al. |

OTHER PUBLICATIONS

Electronic Pull Tabs Advertisement by 21st Century Gaming, published prior to 2002.

Lucky Times California Lottery Newsletter published 1996.

Instant Winner Advertisement by Williams/WMS Gaming, published prior to 2002.

Play it again Advertisement by International Gamco, Inc., published 2000.

CENTRAL DETERMINATION SYMBOL GAME

PRIORITY CLAIM

This application is a continuation of, claims priority to and the benefit of U.S. patent application Ser. No. 12/407,545, filed on Mar. 19, 2009, now U.S. Pat. No. 8,398,472, which is a continuation of, claims priority to and the benefit of U.S. patent application Ser. No. 10/945,642, filed on Sep. 21, 2004, now U.S. Pat. No. 7,524,243, the entire contents of which are each incorporated by reference herein.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND OF THE INVENTION

The present invention relates in general to a poker game and more particularly to a poker game that provides a player a predetermined game outcome.

The majority of the contemporary wagering gaming devices or gaming terminals, such as slot machines or poker games, randomly generate awards and other outcomes. Such gaming terminals typically include a relatively low probability associated with obtaining the highest award, relatively medium probabilities associated with obtaining medium range awards and relatively higher probabilities associated with obtaining low range awards. These gaming terminals also include probabilities associated with obtaining losses or no award at all. The probabilities of obtaining the awards and the amount of the awards determine the average expected pay out percentage of these wagering gaming terminals. Because the outcomes of these gaming terminals are completely randomly determined, there is no certainty that a player will ever obtain any particular award. That is, no matter how many times a player plays the game, since the gaming terminal generates outcomes randomly or completely based upon a probability calculation, there is no certainty that the game will ever provide the player with a rare outcome, such as a jackpot award, or any other specific value for that matter. On the other hand, due to the random determination, the gaming terminal can provide the rare outcomes, such as jackpot awards, numerous times in a small number of plays. For example, a probability-based $1 poker machine gaming terminal may be programmed to payback 95% of all wagers placed with a 1% chance of generating a $10 win outcome, a 5% chance of generating a $5 win outcome, a 10% chance of generating a $2 win outcome, a 40% chance of generating a $1 win outcome and a 44% chance of generating a $0 loss outcome. However, when one hundred game outcomes are generated by the probability-based poker machine gaming terminal, the actual payback may be 137% of all wagers placed and the actual generated outcomes may be six $10 win outcomes, one $5 win outcome, eighteen $2 win outcomes, thirty-six $1 win outcomes and thirty-nine $0 loss outcomes.

This uncertainty is faced by players and casinos or other gaming establishments. For example, certain casinos prefer that a relatively high number of players hit low awards while a relatively low number of players hit high awards. When players hit high awards periodically, casinos attract more players, because of the positive publicity large wins generate. By using desired payback percentages or probabilities, the casinos can also expect to make a certain level of profit. The random determinations can, however, unexpectedly cause casinos to suffer a loss or, on the other hand, to reap great profit in the short run and lose business in the long run due to a reputation for only paying out low awards.

Regulatory bodies in certain jurisdictions do not permit the use of probability-based gaming terminals in-part for these reasons. These regulatory bodies permit the use of wagering gaming terminals which are guaranteed to provide certain or definite awards, so that, for example, a certain number of wins is guaranteed and the overall amount paid back to players is guaranteed. That is, the payback percentage is fixed and not an average expected amount. One type of gaming terminal which complies with this requirement is an instant-type lottery gaming terminal. An instant-type lottery gaming terminal includes a finite pool or set of electronic tickets with each electronic ticket assigned to a predetermined outcome. Alternatively, each electronic ticket could be assigned to a random number or game play seed which is deterministic of a predetermined outcome. In this embodiment, the gaming terminal utilizes the random number or game play seed in a random number generating algorithm to generate random numbers that the gaming terminal then uses to determine and provide the predetermined outcome. In an instant-type lottery gaming terminal, as the predetermined outcome for each electronic ticket is revealed to a player on the gaming terminal, the ticket is removed (i.e., flagged as used) from the finite pool or set of electronic tickets. Once removed from the pool or set, a ticket cannot be used again to determine another game outcome. This type of gaming terminal provides players with all of the available outcomes over the course of the play cycle and guarantees the actual wins and losses.

Since an instant-type lottery gaming machine has a finite pool of predetermined win/loss outcomes, it is possible to configure the pool to specific conditions or criteria requested by the casino or gaming establishment. An example of these conditions or criteria are the number of tickets included in the pool and the exact payback percentage or payback sum for the pool as a whole. The payback percentage or sum represents the guaranteed payout for the entire pool of predetermined outcomes. Other examples of conditions or criteria are what prizes will be awarded and the frequency of winning outcome tickets amongst the total number of tickets for the pool. For example, if a predetermined pool includes twenty $1 tickets and the pool has a payback sum of $10, then the pool might consist of one $5 win outcome, one $2 win outcome, three $1 win outcomes and fifteen $0 loss outcomes and may be represented as the following outcomes: 5, 2, 1, 1, 1, 0, 0, 0, 0, 0, 0, 0, 0, 0, 0, 0, 0, 0, 0, 0. It should be appreciated that the above described pool of twenty tickets is for illustration purposes only and a pool could include any suitable desired number of tickets including a large number such as one million or more.

It should be appreciated that even though a pool may contain more than one of the same game outcome (i.e., the loss or the win and if a win, the value), the presentation to the player (such as the cards dealt or drawn in the case of simulated card games) is preferably varied for each sequential game outcome. For example, in the twenty ticket pool described above, while three game outcomes may each determine a win game outcome with a value of $1, in a poker game machine each game outcome will be preferably presented to the player as one of a plurality of different card combinations that all yield the same $1 win outcome.

Central determination gaming systems are also generally known. A central determination gaming system provides a plurality of individual gaming terminals, located in a gaming establishment, such as a casino, coupled by one or more communication links, to a central processor or controller. When a player plays a game on one of the gaming terminals, a game outcome is randomly generated based on probability data by the central controller. The generated game outcome and how the game outcome is to be presented or displayed to the player are communicated from the central controller to the individual gaming terminal and then provided to the player. It should be appreciated that one central processor may continuously run hundreds or thousands of individual gaming terminals at once. Additionally, each individual gaming terminal may include a plurality of different types of games played at a plurality of different denominations.

In order to comply with the above mentioned regulatory rules that do not permit the use of probability-based gaming terminals, central determination gaming systems have been implemented wherein the central system maintains one or more predetermined pools or sets of game outcomes. Each game outcome in each set or pool includes a game outcome component (i.e., a win, a lose, a secondary game trigger or other suitable outcome) with an associated value or payout amount, if any, and a game presentation component (i.e., how the game outcome is displayed or presented to the player). In these systems, when a player makes a wager on one of the gaming devices, the central system independently selects a game outcome from a set or pool of game outcomes and flags or marks the selected game outcome as used. Once a game outcome is flagged as used, it is prevented from further selection from the set or pool and cannot be selected by the central controller upon another wager. The selected game outcome is communicated to the individual gaming terminal. The individual gaming terminal displays or presents the game presentation component and provides the player the game outcome component with the associated value, if any, for the selected game outcome. Additionally, certain central determination gaming systems have also been implemented wherein the central system maintains one or more predetermined pools or sets of random number or game outcome seeds.

There are a number of advantages to providing for centralized production of game outcomes at individual gaming terminals. Central production or control can assist a casino or other entity in maintaining appropriate records, controlling gaming, reducing and preventing cheating or electronic or other errors, reducing or eliminating win-loss volatility and the like. However, it should be appreciated that existing central determination gaming systems involve minimal to no player interaction other than initiating a game play at a gaming terminal. That is, similar to an instant type lottery game, the central controller selects a game outcome from the pool and the selected game outcome is provided to the player with the player unable to influence the provided game outcome. Therefore, the need exists for a central determination gaming system that provides an increases level of player interaction while still providing a predetermined game outcome to a player.

As described above, in additional to central determination gaming systems, other known gaming devices are operable to provide a player a predetermined outcome. In these gaming devices, rather than receiving an outcome from a central controller, the gaming device stores a plurality of predetermined outcomes in a memory device. Upon a player initiating a game at the gaming device, the predetermined outcome which will ultimately be provided to the player is selected and flagged or marked as used. The gaming device then proceeds with one or more game sequences and upon the conclusion of the game sequences, the selected predetermined outcome is provided to the player.

Poker games are also well known. In a poker game, a gaming device initially deals five cards all face up from a virtual deck of fifty-two card deck. Cards may be dealt as in a traditional game of cards or in the case of the gaming device, may also include that the cards are randomly selected from a predetermined number of cards. If the player wishes to draw, the player selects the cards to hold via one or more input device, such as pressing related hold buttons or via the touch screen. The player then presses the deal button and the unwanted or discarded cards are removed from the display and replacement cards are dealt from the remaining cards in the deck. This results in a final five-card hand. The final five-card hand is compared to a payout table which utilizes conventional poker hand rankings to determine the winning hands. The player is provided with an award based on a winning hand and the credits the player wagered.

In another embodiment, the poker game may include multiple hands of poker played simultaneously. In this embodiment, the player is dealt at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand compared to a payout table and awards are provided to the player.

Some known gaming devices have attempted to provide a poker game wherein the outcome is predetermined. In these known games, a player is shown a first hand of cards and invited to select one or more cards to be discarded. Then the player is shown a final hand and a payoff is provided if the final hand is a winning hand according to a predetermined payout schedule. In these games, the initial hand and the final hand are both predetermined prior to the time the game is started. For this reason, there can often be an inconsistency between the player's selection of cards that are to be discarded and the transition from the initial hand to the final hand. This inconsistency can interfere with the desired simulation of a card game which provides a predetermined outcome.

Moreover, certain players play poker games because they enjoy the skill aspect of poker games. If these players feel that the outcome provided for each play of the poker game is predetermined and not based on the player's skill, these players may lose interest in playing poker games on these gaming devices. That is, certain players play poker games for the skill elements and if these players feel that the skill element has been removed from the poker games, these gaming device may lose appeal amongst certain poker players.

One known gaming device, as described in U.S. Pat. No. 6,729,961 which is assigned on its face to IGT and which issued on May 4, 2004, discloses a poker game wherein an initial hand of cards is displayed to a player. The player designates which of the initial hand of cards are to be held and which are to be discarded and the game displays an intermediate hand generated in accordance with the player-specified designations. In this gaming device, a final hand which is associated with a value equal to the value associated with the predetermined game outcome is shown and in those cases where the player-specified designation (Hold/Discard) is inconsistent with a transition from the intermediate hand to the final hand, an entertaining display is shown and the predetermined game outcome is provided to the player.

Additionally, if there is an inconsistency between the award provided to the player for the player's final hand (which is based on the player holding or discarding one or more cards) and the award associated with the predetermined outcome, other known gaming devices employ a mystery win card to increase or bump the provided win amount up to the win amount associated with the predetermined game outcome. In another known gaming device, any inconsistency between the award provided for the player's final hand (which is based on the player's selections of cards to be held or discarded) and the award associated with the predetermined outcome is held in an escrow or progressive pool to be subsequently provided to the player.

Accordingly, a need exists for an interactive poker game wherein the player may play a traditional true poker game and the outcome provided to the player is predetermined regardless of which cards the player holds and/or discards.

SUMMARY OF THE INVENTION

The present invention relates to a central determination gaming system having a poker game.

In one embodiment, prior to or upon a player initiating a game play at the gaming device, such as by making a wager, a predetermined game outcome is selected. The selected predetermined game outcome represents the outcome which will ultimately be provided to the player. In one embodiment, the predetermined game outcome is stored in a central controller. In this embodiment, upon a player initiating game play at the gaming device, the initiated gaming device communicates a game outcome request to the central server or controller. Upon receiving the game outcome request, the central controller independently selects a game outcome from a set or pool of game outcomes and flags or marks the selected game outcome as used. Once a game outcome is flagged as used, it is prevented from further selection from the set or pool and cannot be selected by the central controller upon another wager. The selected game outcome is communicated to the individual gaming device to be utilized in the initiated poker game. In another embodiment, the predetermined game outcome is stored in a memory device of the gaming device. In this embodiment, the gaming device selects a game outcome from a set or pool of stored game outcomes and flags the selected game outcome as used.

In one embodiment, each predetermined game outcome includes an outcome component, such as a win, a lose, a secondary game triggering or other suitable outcome, with an associated value or pay amount, if any. For example, a predetermined game outcome of win $50 is selected. It should be appreciated that the payout or value associated with the selected predetermined game outcome corresponds to or equals the payout or value associated with one of the poker outcomes which may be obtained in a poker game. For example, if a game outcome of win $50 is selected, the gaming device determines that according to an appropriate paytable, a $50 payout is associated with the player obtaining a full house poker hand and thus, as described in more detail below, the gaming device determines that a full house poker hand must be provided to the player in the poker game. In another embodiment, each game outcome also includes a presentation component. A presentation component is how the game outcome is presented or displayed to the player, such as which specific playing cards will form the hand of cards dealt in a card game.

After selecting or receiving the predetermined game outcome, the gaming device provides or deals a player a plurality of playing cards. One or more of the playing cards provided to the player are based on the selected predetermined game outcome. In one embodiment, the gaming device provides the player five initial playing cards to form an initial poker hand. For example, the playing cards initially dealt to the player may be a queen of hearts, a queen of spades, a seven of clubs, a seven of diamonds and a three of clubs.

After the player is provided an initial poker hand, the player is enabled to select one or more of the initially dealt playing cards to hold or to discard. For example, the player may decide to hold the pair of queens and the pair of sevens and discard the three of clubs.

The gaming device then evaluates the set of cards selected by the player to hold and determines whether a poker hand with an associated payout equal to the value associated with the predetermined game outcome may be obtained based on the held cards. In other words, the gaming device determines if a poker hand with an associated value equal to the selected predetermined game outcome value is obtainable based on the playing cards the player selected to hold. In this embodiment, the determination is based on the held playing cards, the discarded playing cards and the remaining playing cards which may be subsequently dealt to the player. For example, if the selected predetermined game outcome is a win $50 outcome (which corresponds to a full house poker hand), the gaming device determines if a final or second poker hand of a full house is obtainable based on the held pair of queens, the held pair of sevens and the remaining playing cards which may be subsequently dealt to the player.

If the determination is that a poker hand with an associated payout equal to the value associated with the predetermined game outcome may be obtained, the gaming device utilizes one or more backfill algorithms, as discussed in more detail below, to determine which card or cards, if any, need to be dealt to the player to provide the player the poker hand with an associated payout equal to the value associated with the selected predetermined game outcome. Following the example illustrated above, the gaming device will use one or more backfill algorithms to determine that, based on the player's decision regarding which cards to hold and which cards to discard, for the player's initial poker hand to result in a full house final poker hand (which is associated with a payout equal to the payout of the selected game outcome), the discarded three of clubs must be replaced with either a queen playing card or a seven playing card.

After utilizing the backfill algorithm to determine which card or cards must be dealt to the player to insure that a poker hand with an associated payout equal to the value associated with the selected predetermined game outcome is provided to the player, the gaming device provides one or more of the determined card or cards to the player to replace the playing cards designated by the player to discard. The held cards and the subsequently provided cards form a final or second poker hand. With reference to an appropriate paytable, the final poker hand is associated with an award which equals the payout associated with the selected predetermined game outcome. The selected predetermined game outcome is provided to the player and the poker game ends. For example, to replace the discarded three of clubs playing card, the gaming device will provide the player either an additional queen playing card to form a full house poker hand (i.e., three queens and two sevens) or an additional seven playing card to form another full house poker hand (i.e., three sevens and two queens). It should be appreciated that the payout associated with either full house poker hand is equal and therefore the gaming device randomly selects one of the determined playing cards to provide to the player.

If the gaming device determines that a poker hand with an associated payout equal to the value associated with the selected predetermined game outcome cannot be obtained by the player based on the playing cards held by the player, the gaming device selects a subset of the held cards that when combined with one or more subsequently provided playing cards, provide a poker hand with an associated payout equal to the value associated with the selected predetermined game outcome. For example, if the player decided to hold one queen, one seven and the three and discard one queen and one seven, the gaming device determines that the full house poker hand with an associated payout equal to the value associated with selected predetermined game outcome cannot be obtained with the player holding three differently ranked cards. Accordingly, the gaming device utilizes one or more suitable algorithms to select a subset of the held cards. In this case, the subset of held playing cards includes the held queen card and the held seven card which can be used in combination with other playing cards in forming the required full house poker hand. It should be appreciated that in one embodiment, the backfill algorithm may randomly choose which held cards to select to form the subset of held playing cards. For example, rather than selecting the held queen card and the held seven card to form the subset of held playing cards, the gaming device may have selected the three of clubs and one of the held queen playing cards or the three of clubs and one of the held seven playing cards to form the subset of held playing cards.

After selecting a subset of held cards which may be combined with one or more subsequently dealt playing cards to result in a poker hand with an associated payout equal to the value associated with the selected predetermined game outcome, the gaming device utilizes one or more backfill algorithms to determine which cards need to be dealt to the player to provide the player the poker hand with an associated payout equal to the value associated with the selected predetermined game outcome. For example, the gaming device utilizes the backfill algorithm to determine that either two more queen playing cards and one more seven playing card must be provided to the player or that two more seven playing cards and one more queen playing card must be provided to the player.

For any initially dealt playing card designated by the player to discard, the gaming device provides the player one of the playing cards determined using the backfill algorithm. For example, the gaming device will replace the two playing cards the player designated to discard with two of the three determined playing cards.

Additionally, because the subset of held playing cards that will be part of the final poker hand is less than the number of playing cards the player selected to hold, the gaming device must replace one or more of the playing cards the player selected to hold (i.e., at least one of the held playing cards not in the selected subset of held playing cards) with one or more of the playing cards determined using the backfill algorithm. In other words, for one or more held playing card that is not part of the selected subset of held playing cards, the gaming device will replace the held playing card with one of the playing cards determined above using the backfill algorithm. In one embodiment, this replacement of a designated held playing card with another playing card is displayed to the player as an entertaining graphic presentation, such as a sequence of simulated cards or an animated character appearing and replacing the held playing card with another playing card. For example, as the player designated to discard only two cards but three cards need to be provided to the player to provide the player a full house final poker hand, the gaming device must replace one of the held playing cards which is not part of the selected subset of playing cards with one of the determined playing cards. In this case, after the draw, the gaming device will graphically replace or change the held three of clubs playing card with the third of the three playing cards determined using the backfill algorithm.

After providing the player with the playing cards determined using the backfill algorithm (either as a new playing card to replace a discarded playing card or as a new playing card to replace a held playing card), the replaced playing cards and any remaining held playing cards form a final or second poker hand. The selected predetermined game outcome is provided to the player and the poker game ends. With reference to an appropriate paytable, the final or second poker hand is associated with an award which equals the payout associated with the selected predetermined game outcome.

It should be appreciated that in the embodiment described above, the second poker hands provided after the first draw are the final poker hands for the poker game. In another embodiment, at least one additional draw will occur and the second poker hands are not final poker hands but rather are intermediate poker hands. For example, if the poker game of the present invention includes a second draw, then the provided third poker hands would be considered the final poker hands.

In one embodiment, more than one outcome or final poker hand is associated with a payout which corresponds to the value associated with the selected predetermined game outcome. In this embodiment, any outcome which is associated with a payout that corresponds to or equals the value associated with the selected predetermined game outcome may be provided to the player. For example, if according to an appropriate paytable, a full house and a straight are both associated with a payout that equals the value associated with the selected predetermined game outcome, the gaming device will determine if based on the held playing cards, either a full house or straight may be obtained. In this example, if based on the held playing cards a full house cannot be obtained but a straight could be (e.g., the player decided to hold the three and one of the sevens and discard the remaining three cards), then the gaming device utilizes one or more backfill algorithms to determine the cards which should be dealt to the player to provide the player a final poker hand that is associated with a payout which corresponds to the selected predetermined game outcome.

In one embodiment, the number of determined playing cards needed to insure that the player is provided a poker hand which is associated with a payout equal to the payout associated with the selected game outcome is less than the number of cards designated or selected by the player to discard. In this embodiment, the gaming device provides the determined playing cards to the player as well as providing one or more filler playing cards to the player. A filler playing card is determined by the gaming device as a playing card that will not alter the poker hand which is associated with a payout equal to the payout associated with the selected game outcome. For example, if the player selects to discard three of their initially dealt playing cards and the gaming device determines (using one or more backfill algorithms) that only two cards need to be provided to the player, in combination with the player's held cards, to provide the player an appropriate poker hand which is associated with a payout equal to the payout associated with the selected game outcome, then the gaming device will determine a third filler card to provide to the player to replace the third playing card the player selected to discard.

The present invention provides a number of advantages over existing predetermined outcome poker games. For example, since the gaming device of the present invention enables the player to make one or more choices or decisions during the poker game, the present invention includes an aspect of player interaction and player involvement while still providing the player a predetermined outcome. Moreover, the present invention provides a predetermined poker game with an increased variety in how each predetermined outcome is displayed to the player. That is, by utilizing one or more backfill algorithms to determine which playing cards to use to fill the players poker hand, the gaming device of the present invention is increasing the assortment of displayed outcomes which are each associated with a payout equal to the payout associated with the predetermined game outcome.

Additional features and advantages of the present invention are described in, and will be apparent from, the following Detailed Description of the Invention and the figures.

DETAILED DESCRIPTION OF THE INVENTION

Figure 1A:
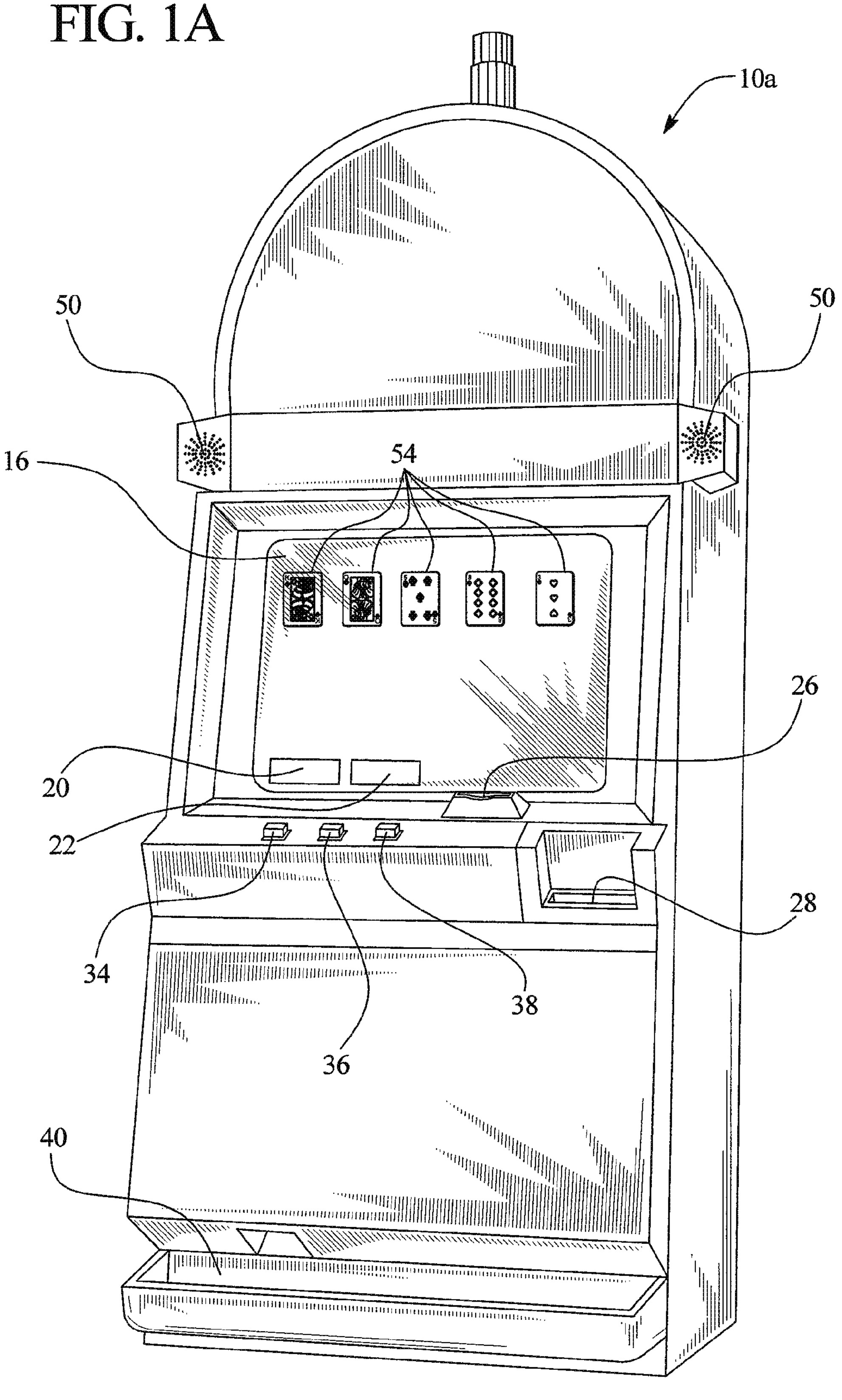
FIGS. 1A and 1B are perspective views of alternative embodiments of the gaming device of the present invention.
Figure 1B:
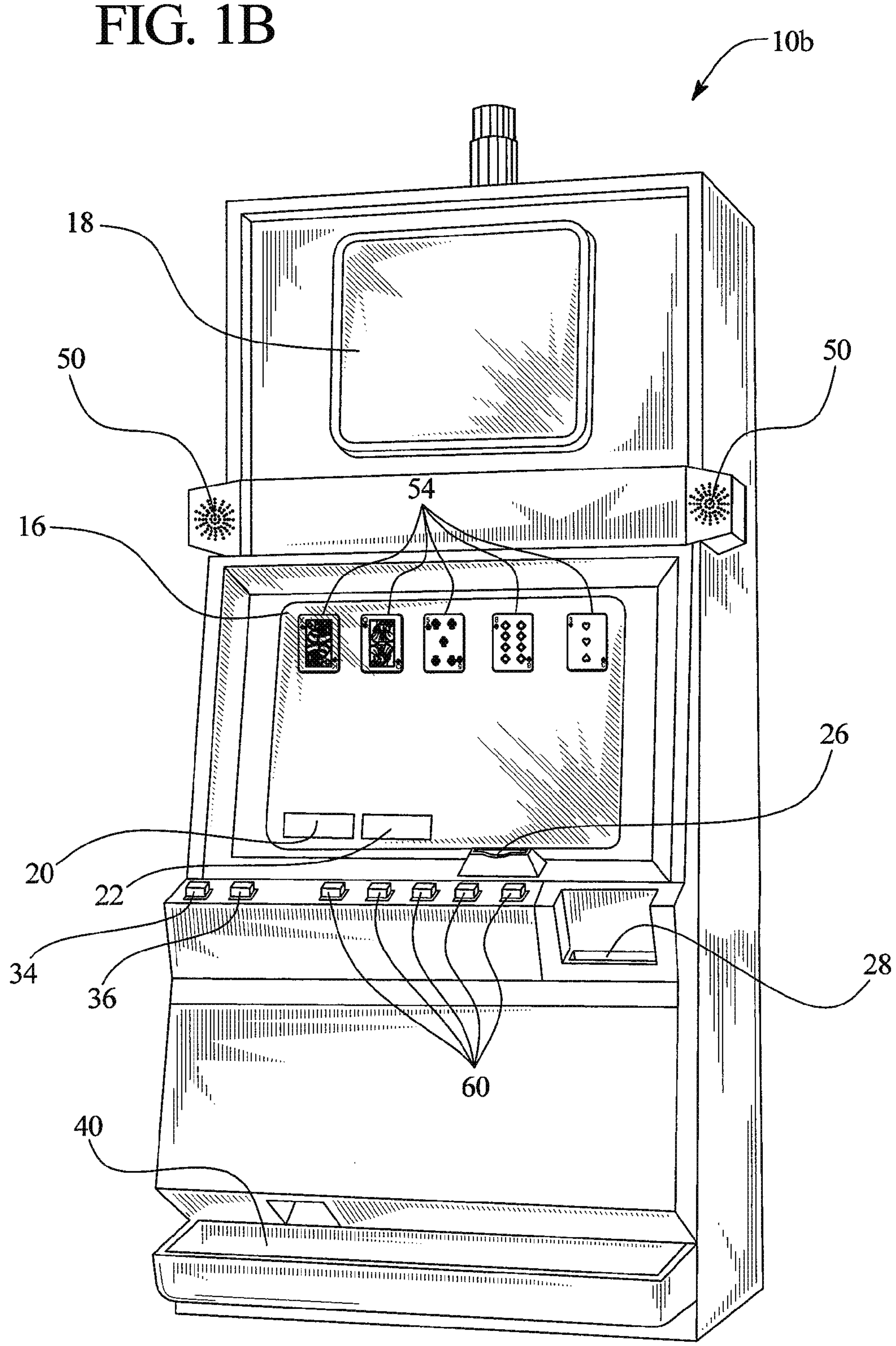

Referring now to the drawings, two alternative embodiments of the gaming device of the present invention are illustrated in FIGS. 1A and 1B as gaming device 10*a* and gaming device 10*b*, respectively. Gaming device 10*a* and/or gaming device 10*b* are generally referred to herein as gaming device 10.

In one embodiment, as illustrated in FIGS. 1A and 1B, gaming device 10 has a support structure, housing or cabinet which provides support for a plurality of displays, inputs, controls and other features of a conventional gaming machine. It is configured so that a player can operate it while standing or sitting. The gaming device may be positioned on a base or stand or can be configured as a pub-style table-top game (not shown) which a player can operate preferably while sitting. As illustrated by the different configurations shown in FIGS. 1A and 1B, the gaming device can be constructed with varying cabinet and display configurations.

Figure 2A:
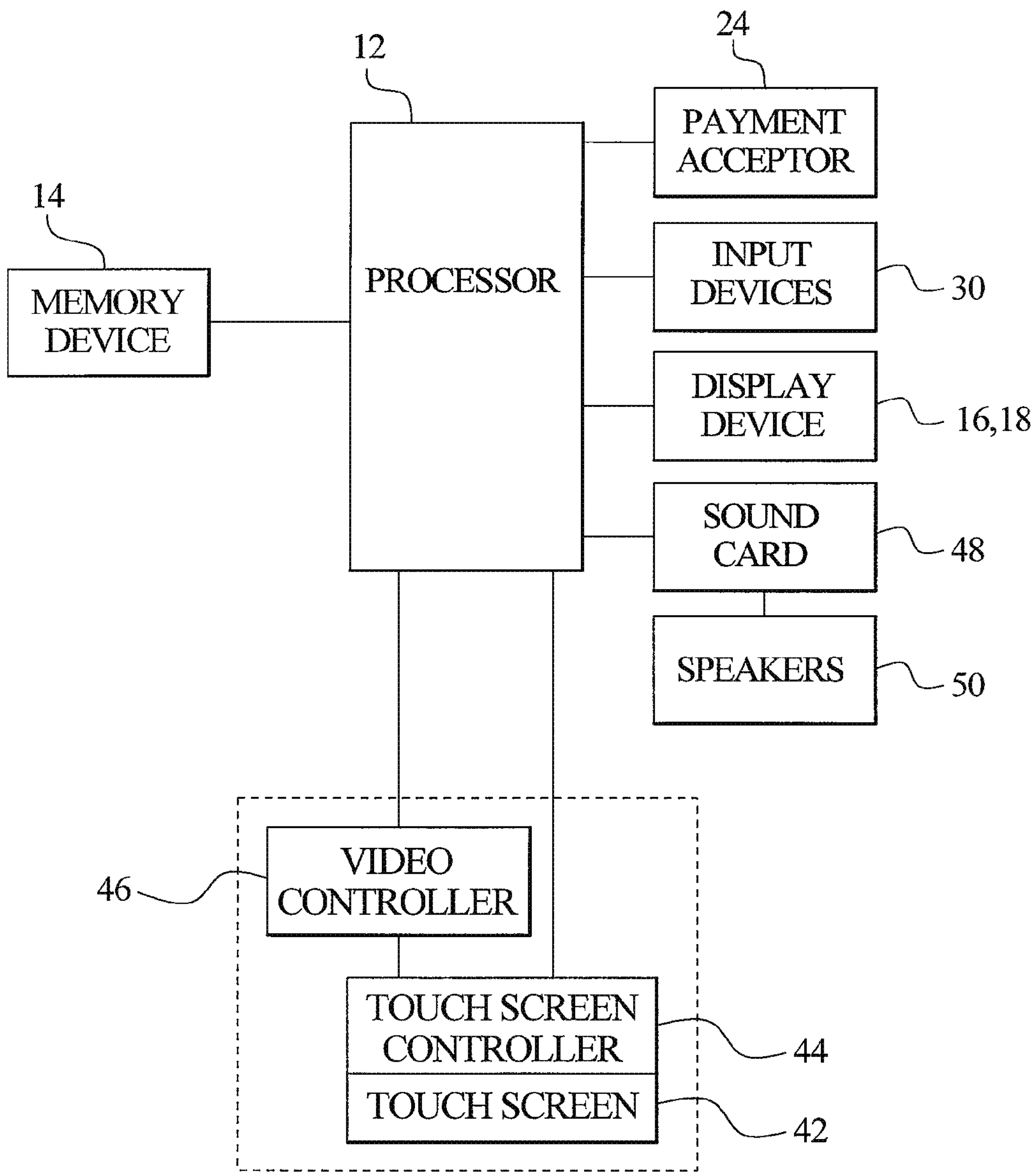
FIG. 2A is a schematic block diagram of an electronic configuration of one embodiment of the gaming terminal of the present invention.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information and applicable game rules that relate to the play of the gaming device. In one embodiment, the memory device stores a pool of predetermined outcomes which will be provided to the players during the play of the interactive poker game of the present invention.

In one embodiment, the memory device includes random access memory (RAM). In one embodiment, the memory device includes read only memory (ROM). In one embodiment, the memory device includes flash memory and/or EEPROM (electrically erasable programmable read only memory). Any other suitable magnetic, optical and/or semiconductor memory may be implemented in conjunction with the gaming device of the present invention.

In one embodiment, part or all of the program code and/or operating data described above can be stored in a detachable or removable memory device, including, but not limited to, a suitable cartridge, disk or CD ROM. A player can use such a removable memory device in a desktop, a laptop personal computer, a personal digital assistant (PDA) or other computerized platform. The processor and memory device may be collectively referred to herein as a "computer."

In one embodiment, as discussed in more detail below, the gaming device employs a predetermined or finite set or pool of awards or other game outcomes. In this embodiment, as each award or other game outcome is provided to the player, the gaming device removes the provided award or other game outcome from the predetermined set or pool. Once removed from the set or pool, the specific provided award or other game outcome cannot be provided to the player again. This type of gaming device provides players with all of the available awards or other game outcomes over the course of the play cycle and guarantees the amount of actual wins and losses.

In one embodiment, as illustrated in FIG. 2A, the gaming device includes one or more display devices controlled by the processor. The display devices are preferably connected to or mounted to the cabinet of the gaming device. The embodiment shown in FIG. 1A includes a central display device 16 which displays a primary game. This display device may also display any secondary game associated with the primary game as well as information relating to the primary or secondary game. The alternative embodiment shown in FIG. 1B includes a central display device 16 and an upper display device 18. The upper display device may display the primary game, any suitable secondary game associated with the primary game and/or information relating to the primary or secondary game. In another embodiment, at least one display device may be a mobile display device, such as a PDA or tablet PC, that enables at least a portion of the primary or secondary game to be played at a location remote from the gaming device. As seen in FIGS. 1A and 1B, in one embodiment, the gaming device includes a credit display 20 which displays a player's current number of credits, cash, account balance or the equivalent. In one embodiment, gaming device includes a bet display 22 which displays a player's amount wagered.

The display devices may include, without limitation, a monitor, a television display, a plasma display, a liquid crystal display (LCD) a display based on light emitting diodes (LED) or any other suitable electronic device or display mechanism. In one embodiment, as described in more detail below, the display device includes a touch-screen with an associated touch-screen controller. The display devices may be of any suitable configuration, such as a square, rectangle, elongated rectangle.

The display devices of the gaming device are configured to display at least one and preferably a plurality of game or other suitable images 54, symbols, playing cards and indicia such as any visual representation or exhibition of the movement of objects such as mechanical, virtual or video reels and wheels, dynamic lighting, video images, images of people, characters, places, things and faces of cards, tournament advertisements and the like.

In one alternative embodiment, the symbols, images and indicia displayed on or of the display device may be in mechanical form. That is, the display device may include any electromechanical device, such as one or more mechanical objects, such as one or more rotatable wheels, reels or dice, configured to display at least one and preferably a plurality of game or other suitable images, symbols or indicia.

As illustrated in FIG. 2A, in one embodiment, the gaming device includes at least one payment acceptor 24 in communication with the processor. As seen in FIGS. 1A and 1B, the payment acceptor may include a coin slot 26 and a payment, note or bill acceptor 28, where the player inserts money, coins or tokens. The player can place coins in the coin slot or paper money, ticket or voucher into the payment, note or bill acceptor. In other embodiments, devices such as readers or validators for credit cards, debit cards or credit slips could be used for accepting payment. In one embodiment, a player may insert an identification card into a card reader of the gaming device. In one embodiment, the identification card is a smart card having a programmed microchip or a magnetic strip coded with a player's identification, credit totals and other relevant information. In one embodiment, money may be transferred to a gaming device through electronic funds transfer. When a player funds the gaming device, the processor determines the amount of funds entered and the corresponding amount is shown on the credit or other suitable display as described above.

As seen in FIGS. 1A, 1B and 2A, in one embodiment the gaming device includes at least one and preferably a plurality of input devices 30 in communication with the processor. The input devices can include any suitable device which enables the player to produce an input signal which is read by the processor. In one embodiment, after appropriate funding of the gaming device, the input device is a game activation device, such as a play button 34 which is used by the player to start any primary game or sequence of events in the gaming device. The play button can be any suitable play activator such as a bet one button, a max bet button or a repeat the bet button. In one embodiment, upon appropriate funding, the gaming device begins the game play automatically. In another embodiment, upon the player engaging one of the play buttons, the gaming device automatically activates game play.

In one embodiment, as shown in FIGS. 1A and 1B, one input device is a bet one button 36. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 38. The player may push the cash out button and cash out to receive a cash payment or other suitable form of payment corresponding to the number of remaining credits. In one embodiment, when the player cashes out, the player receives the coins or tokens in a coin payout tray 40. In one embodiment, when the player cashes out, the player may receive other payout mechanisms such as tickets or credit slips redeemable by a cashier or funding to the player's electronically recordable identification card.

In one embodiment, shown in FIG. 1B, the gaming device also includes a plurality of hold/discard buttons 60. The player may designate each of the plurality of playing cards dealt to the player as either a hold or discard by using the hold/discard buttons. In one embodiment, the gaming device includes one hold/discard button for all of the playing cards. In another embodiment, the gaming device includes an individual hold/discard button for each of the dealt playing cards.

In one embodiment, as mentioned above and seen in FIG. 2A, one input device is a touch-screen 42 coupled with a touch-screen controller 44, or some other touch-sensitive display overlay to allow for player interaction with the images on the display. The touch-screen and the touch-screen controller are connected to a video controller 46. A player can make decisions, such as which playing cards to hold or discard and input signals into the gaming device by touching touch-screen at the appropriate places.

The gaming device may further include a plurality of communication ports for enabling communication of the processor with external peripherals, such as external video sources, expansion buses, game or other displays, an SCSI port or a key pad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as playing music for the primary and/or secondary game or for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized for or to provide any appropriate information.

In one embodiment, the gaming machine may include a sensor, such as a camera in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in either an analog, digital or other suitable format. The display devices may be configured to display the image acquired by the camera as well as display the visible manifestation of the game in split screen or picture-in-picture fashion. For example, the camera may acquire an image of the player and that image can be incorporated into the primary and/or secondary game as a game image, symbol or indicia.

Figure 2B:
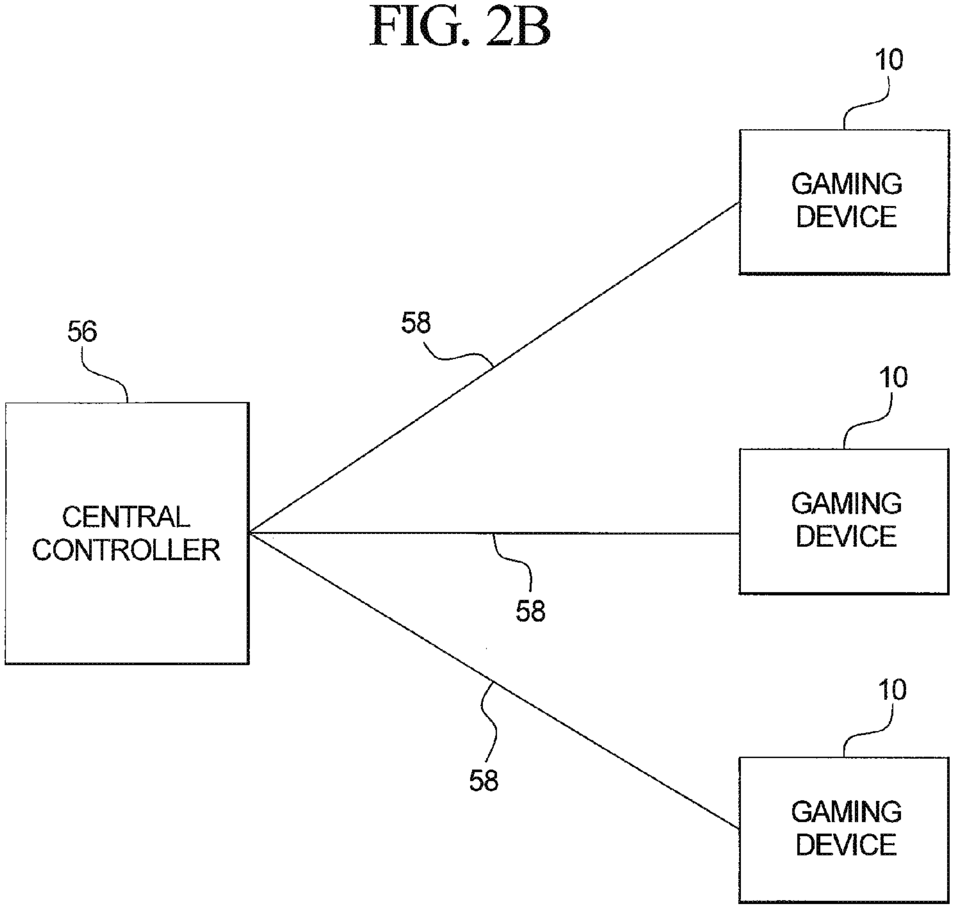
FIG. 2B is a schematic block diagram illustrating a plurality of gaming terminals in communication with a central controller.

In one embodiment, as illustrated in FIG. 2B, one or more of the gaming devices 10 of the present invention may be connected to each other through a data network or a remote communication link 58 with some or all of the functions of each gaming device provided at a central location such as a central server or central controller 56. More specifically, the processor of each gaming device may be designed to facilitate transmission of signals between the individual gaming device and the central server or controller.

In one embodiment, the predetermined game outcome provided to the player is selected by a central server or controller and provided to the player at the gaming device of the present invention. In this embodiment, each of a plurality of such gaming devices are in communication with the central server or controller. Upon a player initiating game play at one of the gaming devices, the initiated gaming device communicates a game outcome request to the central server or controller. Upon receiving the game outcome request, the central controller independently selects a game outcome from a set or pool of game outcomes and flags or marks the selected game outcome as used. Once a game outcome is flagged as used, it is prevented from further selection from the set or pool and cannot be selected by the central controller upon another wager. The selected game outcome is communicated to the individual gaming device to be utilized in the poker game.

In one embodiment, the central controller maintains at least one predetermined set or pool of predetermined game outcomes for each type of game provided on the gaming terminals. In an alternative embodiment, the central controller maintains a plurality of predetermined sets or pools of predetermined game outcomes for each type of provided game. In another embodiment, the central controller maintains a predetermined set or pool of predetermined game outcomes for each denomination of each type of game provided on the gaming terminals. In another embodiment, the central controller maintains at least one predetermined set or pool of predetermined game outcome seeds. Each game outcome seed is deterministic of a predetermined game outcome. Other methods for storing the pool or set of predetermined game outcomes may be employed in accordance with the present invention.

Each predetermined game outcome includes an outcome component, such as a win, a lose, a secondary game triggering or other suitable outcome, with an associated value or pay amount, if any. For example, one game outcome may be a win $5 game outcome and another game outcome may be a lose or $0 game outcome. Each set or pool of predetermined game outcomes may include a plurality of each type of predetermined game outcome. For example, a pool of one thousand game outcomes may include hundreds of a lower range award (i.e., a win $1 game outcome) and one or few of the highest award (i.e., a win $1000 game outcome). In one embodiment, a plurality of the game outcomes in the predetermined set or pool are different. In another embodiment, all of the game outcomes in the set or pool are different.

In one embodiment, each game outcome may also include a presentation component. A presentation component is how the predetermined game outcome is presented or displayed to the player, such as a specific hand of cards dealt. In order to increase player entertainment, a plurality of game outcomes with the same outcome component and associated value have different presentation components. That is, the same win $5 game outcome is presented or displayed to the player in a different way. For example, in a poker style game, each of the same game outcomes are displayed or presented to the player as a different hand of cards. It should be appreciated that through the use of an appropriate pay table for the specific game played, the presentation component for each game outcome corresponds to the outcome component and associated value, if any, for that game outcome.

In one embodiment, the value or payout associated with each of the predetermined game outcomes corresponds to a value or payout associated with each of the available poker hands which may be obtained by a player. In this embodiment, a win game outcome associated with a payout of $10,000 may correspond to a poker hand with, according to an appropriate paytable, an associated payout of $10,000. Moreover, each lose game outcome which is associated with a payout of $0 may correspond to each of the possible poker hands which, according to an appropriate paytable, are non-winning hands associated with a payout of $0.

In one embodiment, all of the gaming terminals which are coupled to the central processor are configured to play the same type of game. In an alternative embodiment, a plurality of the gaming terminals are configured so that different gaming terminals may be used to play different types of games. That is, some gaming terminals may be used for playing a slot machine style game, others may be used for playing a poker style game, others may be used for playing a blackjack style game, and the like. In another embodiment, a plurality of gaming terminals may each be configured for playing a plurality of different games.

In another embodiment, one or more of the gaming devices of the present invention are in communication with a central server or controller for monitoring purposes only. In this embodiment, each gaming device stores a pool of predetermined outcomes to be provided to the player in a memory and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

In one embodiment, a plurality of the gaming devices of the present invention are connected together and to a central controller through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system of the present invention may be substantially identical to the LAN gaming system described above, although the number of gaming devices in each system may vary relative to each other.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital signal line (DSL), T-1 line, coaxial cable, fiber optic cable, or other suitable connection. In this embodiment, players may access an internet game page from any location where an internet connection and computer, or other internet facilitator are available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications according to the present invention, particularly if such communications are encrypted. Higher data transmission speeds may be useful for enhancing the sophistication and response of the display and interaction with the player.

In another embodiment, a plurality of gaming devices at one or more gaming sites may be networked to a central server and operable to provide one or more progressive awards to one or more players. A progressive award is an award amount which includes an initial amount funded by a casino and an additional amount funded through a portion of each wager made on the progressive gaming device. For example, 1% of each wager on the primary game of the gaming device may be allocated to the progressive award or progressive award fund. The progressive award grows in value as more players play the gaming device and more portions of the players' wagers are allocated to the progressive award. In one embodiment, the progressive award payout is associated with one or more of the predetermined game outcomes which are stored in the pool of predetermined game outcomes.

When a player obtains a winning outcome which results in or is associated with the progressive award, the accumulated progressive award is provided to the player. After the progressive award is provided to the player, the amount of the next progressive award is reset to the initial value and a portion of each subsequent wager is allocated to the next progressive award as described above. In one embodiment, a host site computer is coupled to a plurality of the central servers at a variety of mutually remote gaming sites for providing a multi-site linked progressive automated gaming system. In one embodiment, a host site computer may serve gaming devices distributed throughout a number of properties at different geographical locations including, for example, different locations within a city or different cities within a state.

In one embodiment, the host site computer is maintained for the overall operation and control of the system. In this embodiment, a host site computer oversees the entire progressive gaming system and is the master for computing all progressive jackpots. All participating gaming sites report to, and receive information from, the host site computer. Each central server computer is responsible for all data communication between the gaming device hardware and software and the host site computer.

In one embodiment, the poker game of the present invention may be employed as either a primary game or a base game. If the poker game is implemented as a secondary game, then the gaming device can incorporate any suitable wagering primary or base game. The gaming machine or device of the present invention may include some or all of the features of conventional gaming machines or devices. The primary or base game may comprise any suitable reel-type game, card game, number game or other game of chance susceptible to representation in an electronic or electromechanical form which produces a predetermined outcome upon activation from a wager. That is, different primary wagering games, such as video poker games, video blackjack games, video Keno, video bingo or any other suitable primary or base game may be implemented into the present invention.

In another embodiment, if the game is implemented as a primary game, then in addition to winning credits in the primary poker game, the gaming device may also give players the opportunity to win credits in a bonus or secondary game or bonus or secondary round. The bonus or secondary game enables the player to obtain a prize or payout in addition to the prize or payout, if any, obtained from the base or primary game.

In one embodiment, the bonus or secondary game may be any type of suitable game, either similar to or completely different from the base or primary game. In one embodiment, the gaming device includes a program which will automatically begin a bonus round when the player has achieved a triggering event or qualifying condition in the base or primary game. In one embodiment, the triggering event or qualifying condition may be a selected outcome in the primary game or a particular arrangement of one or more indicia on a display device in the primary game. In another embodiment, the triggering event or qualifying condition may be by exceeding a certain amount of game play (number of games, number of credits, amount of time), reaching a specified number of points earned during game play or as a random award.

In one embodiment, once a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or geometric increase in the number of bonus wagering credits awarded. In one embodiment, extra bonus wagering credits may be redeemed during the bonus game to extend play of the bonus game.

It should be appreciated that if the gaming device enables the player to play a secondary game in addition to the poker game, then regardless of how the game outcome is ultimately provided to the player, either as a value or payout from the primary or base game, as a value or payout from the secondary or bonus game, as a lose from the primary or base game or as a lose from the secondary or bonus game, the game outcome is predetermined. For example, if the particular game outcome associated with the player's choice or decision is a win outcome with an associated value or payout of $10, the outcome may be presented to the player as a $10 win outcome in the primary or base game, a $10 secondary or bonus game win outcome or any combination of payouts in the primary or base game and secondary or bonus game that result in a total payout of $10. Either way, the player is provided $10 and that particular game outcome is removed from the set of game outcomes.

Figure 3:
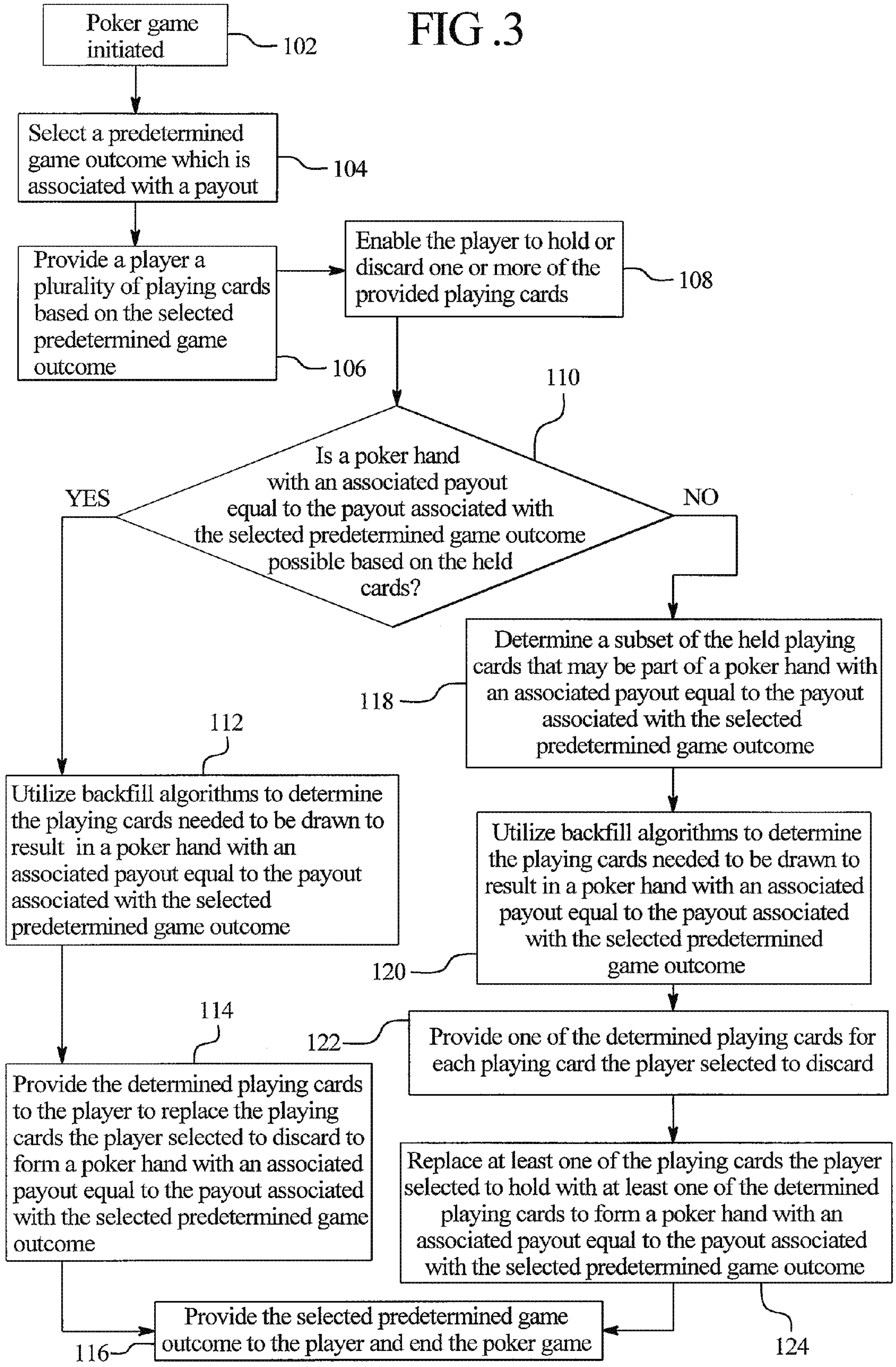
FIG. 3 is a schematic block diagram illustrating one embodiment of the present invention wherein a predetermined game outcome is selected and the player plays an poker game wherein the selected predetermined game outcome is provided to the player.

Referring to FIG. 3, the game play of the poker game of the present invention is initiated by a player inserting the appropriate amount of money or tokens at the gaming device as indicated in block 102. After the poker game is initiated, a predetermined outcome is selected as indicated in block 104.

In one embodiment, as described above, the gaming device is in communication with the central controller and the central controller selects a predetermined game outcome. The central controller then flags the selected game outcome as used (i.e., preventing the selected game outcome from being subsequently selected by the central controller) and communicates the predetermined game outcome to the gaming device. In another embodiment, the gaming device selects one of the predetermined outcomes stored in a memory device of the gaming device.

In another embodiment, a predetermined game outcome is determined for each of a plurality of linked or networked gaming devices based on the results of a Bingo game. In this embodiment, each individual gaming device utilizes the game outcome provided to that gaming device in a Bingo game as the predetermined game outcome for a displayed poker game at that gaming device. In one embodiment, the game outcomes determined in the Bingo game are utilized in the poker game and the Bingo game is displayed to the player.

In these embodiments, as each gaming device is enrolled in the Bingo game, such as upon an appropriate wager or engaging an input device, the enrolled gaming device is provided a different Bingo card. Each Bingo card consists of a matrix or array of elements, wherein each element is designated with a separate indicia, such as a number. It should be appreciated that each different Bingo card includes a different combination of elements. For example, if four Bingo cards are provided to four enrolled gaming devices, the same element may be present on all four of the Bingo cards while another element may solely be present on one of the Bingo cards.

In operation of this embodiment, upon providing a different Bingo card to each of a plurality of enrolled gaming devices, the central controller randomly selects or draws, one at a time, a plurality of the elements. As each element is selected, each gaming device determines if the selected element is present on the Bingo card provided to that enrolled gaming device. If the selected element is present on the Bingo card provided to that enrolled gaming device, that gaming device marks or flags the selected element on the provided Bingo card. This process of selecting elements and marking any selected elements on the provided Bingo cards continues until one or more predetermined patterns are marked on one or more of the provided Bingo cards. It should be appreciated that in one embodiment, the gaming device requires the player to engage a "daub" button (not shown), in order to initiate the process of the gaming device marking or flagging any selected elements.

After one or more predetermined patterns are marked on one or more of the provided Bingo cards, a game outcome is determined for each of the enrolled gaming devices based, at least in part, on the selected elements on the provided Bingo cards. As described above, the game outcome each gaming device determines for the Bingo game is utilized by that gaming device as the predetermined game outcome provided to the player in the displayed poker game. For example, a first gaming device to mark selected elements in a predetermined pattern is provided a first outcome of win $10 which will be provided to the player in the poker game regardless of how the player plays the provided initial poker hand and a second gaming device to mark selected elements in a different predetermined pattern is provided a second outcome of win $2 which will be provided to the player in the poker game regardless of how the player plays the provided initial poker hand. It should be appreciated that as the process of marking selected elements continues until one or more predetermined patterns are marked, this embodiment insures that at least one Bingo card will win the Bingo game and thus at least one enrolled gaming device will provide a predetermined winning game outcome to a player in at least one poker game.

After selecting, determining or receiving the predetermined game outcome, the gaming device provides or deals the player a plurality of playing cards as indicated in block 106. At least one and preferably a plurality of the dealt playing cards are based on the selected predetermined game outcome. The playing cards dealt to the player form an initial poker hand. In different embodiments, the initial poker hand is associated with a value or payout less than, greater than or equal to the value or payout associated with the selected predetermined game outcome.

In one embodiment, the playing cards are dealt from a single fifty-two card deck. In another embodiment, the playing cards are dealt from a plurality of fifty-two card decks. In another embodiment, the playing cards are selected from a predetermined set of cards. In another embodiment, the playing cards are selected from a deck of more than fifty-two playing cards, such as a deck including one or more "joker" or wild playing cards. In this embodiment, as a joker or wild playing card may substitute for any other playing card, the number of playing cards which need to be determined using the backfill algorithm is reduced for each provided joker playing card.

After the player is provided an initial poker hand, the player is enabled to select one or more of the initially dealt playing cards to hold or to discard as indicated in block 108. The gaming device evaluates the set of cards the player selected to hold and determines whether a poker hand with an associated payout equal to the value associated with the predetermined game outcome may be obtained based on the held cards as indicated in diamond 110. In other words, the gaming device determines if a poker hand with an associated value equal to the selected predetermined game outcome value is obtainable based on the playing cards the player selected to hold. In one embodiment, the gaming device determines based on the held playing cards, the discarded playing cards and the remaining playing cards which may be subsequently dealt to the player if the predetermined game outcome may be obtained by the player.

If the gaming device determines that a poker hand with an associated payout equal to the value associated with the predetermined game outcome may be obtained based on the held cards, the gaming device utilizes one or more backfill algorithms to determine which cards need to be dealt to the player to provide the player the poker hand with an associated payout equal to the value associated with the selected predetermined game outcome as indicated in block 112.

After utilizing the backfill algorithm to determine which card or cards must be dealt to the player to insure that a poker hand with an associated payout equal to the value associated with the selected predetermined game outcome is provided to the player, the gaming device provides the determined card or cards to the player to replace the playing cards designated by the player to discard as indicated in block 114. The held cards and the subsequently provided playing cards form a final poker hand.

In one embodiment, the number of determined playing cards needed to insure that the player is provided a poker hand which is associated with a payout equal to the payout associated with the selected game outcome is less than the number of cards designated or selected by the player to discard. In this embodiment (not shown), the gaming device provides the determined playing cards to the player to replace one or more of the playing cards selected by the player to discard as well as providing one or more filler cards to replace one or more of the playing cards selected by the player to discard. Each filler card is determined by the gaming device as a playing card that will not alter or affect the payout associated with the determined final poker hand which is equal to the payout associated with the selected game outcome.

After providing the player a final poker hand which is associated with a payout equal to the payout associated with the selected predetermined game outcome, the selected predetermined game outcome is provided to the player and the poker game ends as indicated in block 116.

On the other hand, if the gaming device determines that a poker hand with an associated payout equal to the value associated with the selected predetermined game outcome cannot be obtained by the player based on the playing cards held by the player, the gaming device selects a subset of the held cards that when combined with one or more subsequently provided playing cards, results in a poker hand with an associated payout equal to the value associated with the selected predetermined game outcome as indicated in block 118. In one embodiment, the selected subset is randomly determined. In another embodiment, the selected subset is the largest subset possible. The gaming device utilizes one or more backfill algorithms, as described in more detail below, to determine which cards need to be dealt to the player to provide the player the poker hand with an associated payout equal to the value associated with the selected predetermined game outcome as indicated in block 120.

For each playing card the player designated as a discard, the gaming device provides the player one of the playing cards determined using the backfill algorithm as indicated in block 122. Additionally, because the subset of held playing cards that will be part of the final poker hand is less than the number of playing cards the player selected to hold, the gaming device must replace one or more of the playing cards the player selected to hold (i.e., at least one of the held playing cards not in the selected subset of held playing cards) with one or more of the playing cards determined using the backfill algorithm as indicated in block 124. It should be appreciated that if the player designated to discard a playing card that was needed to provide the player a poker hand associated with a payout equal to the payout of the selected predetermined game outcome, during an appropriate replace sequence, the gaming device would reprovide the previously discarded playing card back to the player.

In one embodiment, this replacement of a designated held playing card with another playing card is displayed to the player as any suitable graphic presentation, such as a sequence of simulated cards, a morphing display in which the player's held card is displayed as transforming into the determined replaced card or an animated character appearing and replacing the held playing card with the determined playing card.

In one embodiment, after the gaming device determines the playing cards which must be subsequently provided to the player to produce a poker hand with an associated payout equal to the payout associated with the selected predetermined game outcome and before the draw of replacing the cards the player designated to discard with the determined playing cards, if necessary, the gaming device replaces one or more of the playing cards the player designated to hold which must be replaced to provide the player the selected predetermined game outcome. In another embodiment, after the draw of replacing the cards the player designated to discard with the determined playing cards, if necessary, the gaming device replaces one or more of the playing cards the player designated to hold which must be replaced to provide the player the selected predetermined game outcome.

After providing the player a final poker hand (based on the replaced playing cards and any remaining held playing) which is associated, according to an appropriate paytable, with a payout equal to the payout associated with the selected predetermined game outcome, the selected predetermined game outcome is provided to the player and the poker game ends as indicated in block 116.

In one embodiment, the number of playing cards in each initial poker hand and each second or final poker hand is the same. In another embodiment, the number of playing cards in each of the initial poker hands and in each of the second poker hands are different. In one embodiment, the second or final poker hands have less cards than the initial poker hands. In another embodiment, the second or final poker hands have more cards than the initial poker hands. For example, each initial poker hand may include four playing cards and each of the second poker hands may include five playing cards. In this embodiment, the player is enabled to hold or discard zero to four of the initially dealt playing cards and the gaming device replaces/draws the number of cards that the player requested plus one additional card. This additional card provides that the player's second poker hand is provided an outcome based on the player's five-card second poker hand.

In one embodiment, the gaming device employs a conventional auto-hold feature which may be always activated or selectively activated by the player or operator. The auto-hold feature suggests to the player which cards to hold and which cards to discard based on a predetermined hold strategy. It should be appreciated that the auto-hold feature only suggests to the player which cards to hold and discard and does not force the player to hold or discard any of the provided playing cards.

In one embodiment, the auto-hold strategy is set to perform sub-optimally and suggest to the player to hold cards which will not be part of a poker hand with an associated payout equal to the value associated with the predetermined game outcome. In this embodiment, by suggesting to the player to hold cards which will not be part of the poker hand with an associated payout equal to the value associated with the predetermined game outcome, the gaming device causes one or more held cards to be replaced with gaming device determined cards as indicated in blocks 118, 120, 122 and 124 in FIG. 3. In other words, by suggesting to the player to follow a course of action that leads to the gaming device replacing the player's held cards with other determined cards, the player becomes inured to the card replacement feature which forces the predetermined game outcome on the player. In another embodiment, the gaming device employs an optimal hold strategy but provides the player an initial set of playing cards which, when playing according to the suggested optimal hold strategy, makes obtaining the selected predetermined game outcome impossible and thus necessitating that the gaming device causes one or more held cards to be replaced with gaming device determined cards as indicated in blocks 118, 120, 122 and 124 in FIG. 3. This embodiment provides that the player becomes inured to the card replacement feature which forces the predetermined game outcome on the player while also enabling the player to play their initial poker hand optimally.

In one embodiment, as the total outcomes provided to the player are predetermined, the paytable utilized to determine the payout of each available poker hand is altered compared to the paytable utilized in a traditional poker game. In traditional poker games the occurrence of small win, high frequency outcomes is based on probability data and cannot be controlled. On the other hand, over the course of a complete play cycle (i.e., selecting each of a pool of game outcomes), the present invention controls the occurrence of all outcomes and thus the paytable of the present invention may be overweighed such that certain outcomes which are associated with small payouts but high occurrences of being obtained can be associated with larger payouts when compared to traditional poker games.

Figure 4:
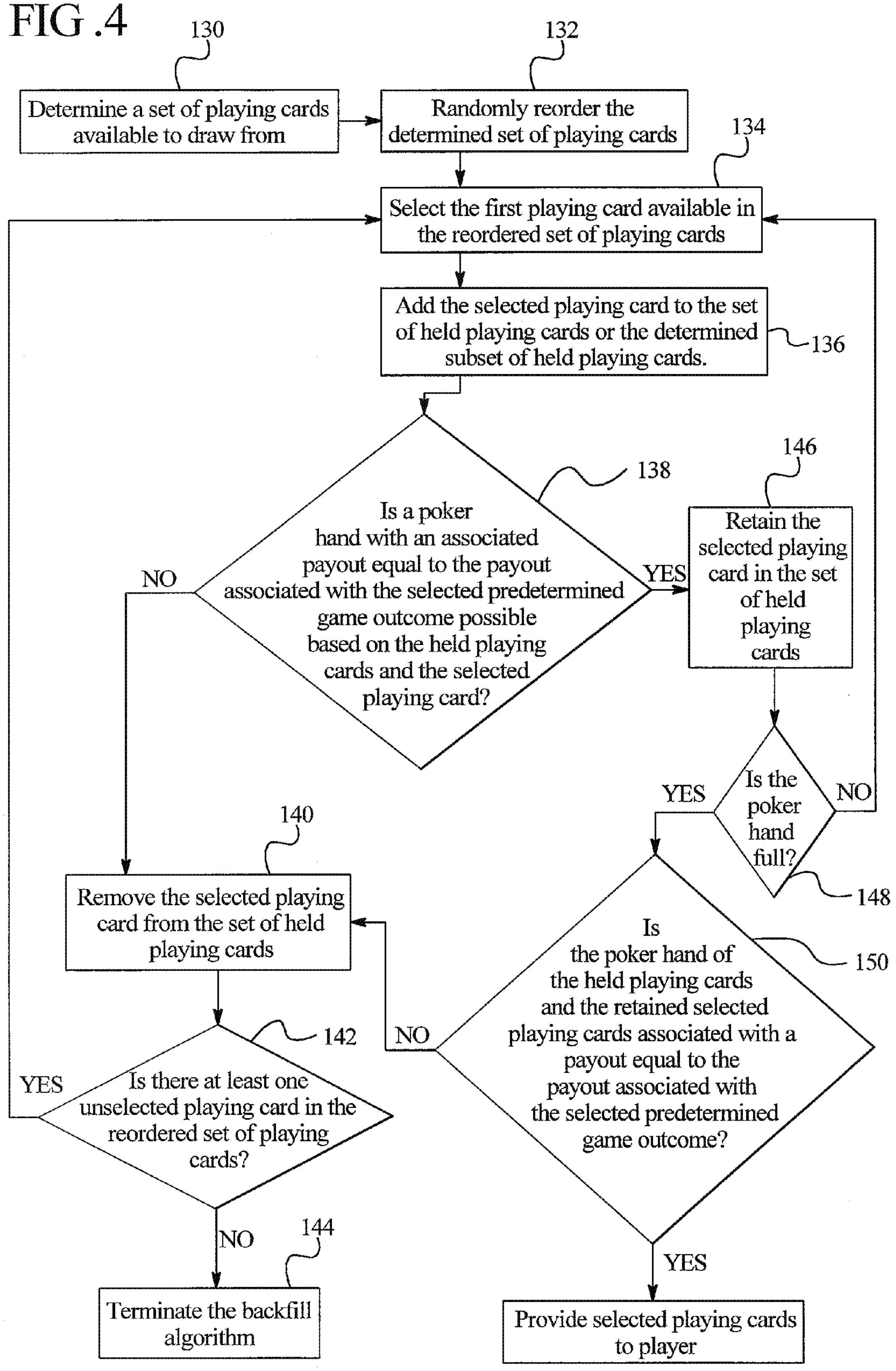
FIG. 4 is a schematic block diagram illustrating one embodiment of how the backfill algorithm determines the playing cards needed to be provided to the player to result in a final poker hand with an associated payout equal to the payout associated with the selected predetermined game outcome.

FIG. 4 illustrates one embodiment of how a suitable backfill algorithm of the present invention operates to determine the cards needed to be drawn to result in a poker hand with an associated payout equal to the payout associated with the selected predetermined game outcome. In one embodiment, the backfill algorithm is provided with data or information regarding the selected predetermined game outcome, the set of cards selected by the player to hold, the set of cards selected by the player to discard and the set of cards available to draw playing cards from. The backfill algorithm is also provided data or information regarding the appropriate paytable utilized by the gaming device for the poker game. As illustrated in FIG. 4, when the backfill algorithm is implemented, the gaming device determines or produces a set of playing cards available to draw from as indicated in block 130.

In one embodiment, the set of playing cards to draw from is the same initial set of playing cards from which the initial poker hand was selected from. In another embodiment, the set of playing cards to draw from is the initial set of playing cards with the previously dealt playing cards removed. For example, if the poker game is played with a fifty-two card deck, then the set of playing cards to draw from is the forty-seven cards remaining after the five initial playing cards are provided to the player. In another embodiment, the set of playing cards is a randomly chosen subset of playing cards. In another embodiment, the set of cards to draw from may be merged with other sets of playing cards, such as the playing cards the player designated to hold, the playing cards the player designated to discard, a randomly selected subset of playing cards held cards or any other suitable set of cards.

The gaming device reorders the determined set of playing cards as indicated in block 132. In one embodiment, the gaming device randomly reorders the set of playing cards. In another embodiment, the gaming device reorders the set of playing cards such that the playing cards held by the player are randomly placed at the beginning of the set, the non-provided playing cards remaining to be drawn are randomly placed next in the set and the playing cards discarded by the player are randomly placed next in the set. This reordering of the set of available playing cards to draw from provides that any one of the possible game outcomes which are associated with a payout equal to the payout associated with the selected predetermined game outcome may be obtained by the player. The gaming device selects the first playing card available in the reordered set of playing cards as a candidate card as indicated in block 134.

The gaming device adds the selected or candidate playing card to the set of held playing cards or the determined subset of held playing cards as indicated in block 136. Whether the gaming device adds the selected playing card to the set of held playing cards or the determined subset of held playing cards is determined based on the result of diamond 110 in FIG. 3. For example, if in FIG. 3, a poker hand with an associated payout equal to the payout associated with the selected game outcome is possible based on the held playing cards, then in FIG. 4, the gaming device adds the selected playing card to the set of held playing cards. On the other hand, if in FIG. 3, a poker hand with an associated payout equal to the payout associated with the selected game outcome is not possible based on the held playing cards, the gaming device determines a subset of the playing cards that may be part of a poker hand with an associated payout equal to the payout associated with the selected game outcome and then in FIG. 4, the gaming device adds the selected playing card to the determined subset of playing cards. It should be appreciated the backfill algorithm illustrated in FIG. 4 is one example of how the gaming device utilizes the backfill algorithm to determined the cards need to be drawn to result in a poker hand with an associated payout equal to the payout associated with the selected game outcome in blocks 112 and 120 of FIG. 3.

After adding the selected or candidate playing cards to either the held playing cards or the determined subset of held playing cards, the gaming device determines whether a poker hand with an associated payout equal to the payout associated with the selected game outcome is possible based on the held playing cards (or the determined subset of held playing cards) and the selected playing card as indicated in diamond 138.

If a poker hand with an associated payout equal to the payout associated with the selected game outcome is not possible based on the held playing cards (or the determined subset of held playing cards) and the selected playing card, the gaming device removes the selected playing card from the set of held playing cards (or the determined subset of held playing cards) as indicated in block 140. The gaming device then determines if there is at least one unselected playing card in the reordered set of playing cards as indicated in diamond 142. If there is at least one unselected playing card in the reordered set of playing cards, the gaming device returns to block 134 and selects the next playing card available in the reordered set of playing cards. The gaming device then proceeds from block 134 as described above.

If there is not at least one unselected playing card in the reordered set of playing cards, the gaming device terminates the backfill algorithm as indicated in block 144. In one embodiment, if the gaming device terminates the backfill algorithm, the gaming device may return to block 118 of FIG. 3 and determines another subset of held playing cards that may be part of a poker hand with an associated payout equal to the payout associated with the selected game outcome. In this embodiment, the gaming device then proceeds to run the backfill algorithm again using the other determined subset of held playing cards. For example, if the gaming device selected a subset of three held playing cards and after determining that none of the remaining available playing cards may be added to the subset of three held playing cards to form a poker hand that is associated with a payout equal to the payout associated with the selected predetermined game outcome, the gaming device will return to block 118 of FIG. 3 and select another subset of two held playing cards. In this example, the gaming device will then run the backfill algorithm using the subset of two held playing cards and attempt to form a poker hand associated with a payout equal to the payout associated with the selected predetermined game outcome.

If a poker hand with an associated payout equal to the payout associated with the selected game outcome is possible based on the held playing cards (or the determined subset of held playing cards) and the selected playing card, the gaming device retains the selected playing card in the set of held playing cards (or the determined subset of held playing cards) as indicated in block 146.

The gaming device then determines if the poker hand is completed as indicated in diamond 148. If the poker hand is completed, the gaming device confirms that the completed poker hand of the held playing cards (or the determined subset of held playing cards) and the retained selected playing cards is associated with a payout equal to the payout associated with the selected predetermined game outcome as indicated in diamond 150. If the gaming device cannot confirm that the completed poker hand of the held playing cards (or the determined subset of held playing cards) and the retained selected playing cards is associated with a payout equal to the payout associated with the selected predetermined game outcome, then the gaming device removes the selected playing card from the set of playing cards as indicated in block 140. The backfill algorithm then proceeds from block 140 as described above.

If the gaming device confirms that the completed poker hand of the held playing cards (or the determined subset of held playing cards) and the retained selected playing cards is associated with a payout equal to the payout associated with the selected predetermined game outcome, the gaming device provides the selected retained playing cards to the player as indicated in block 152. It should be appreciated that the gaming device provides the retained playing cards to the player in a manner described above with respect to blocks 114, 122 and 124 of FIG. 3. That is, if a poker hand with a payout equal to the payout associated with the selected predetermined game outcome can be obtained based on the playing cards the player selected to hold, then the gaming device merely provides the player the retained selected playing cards to replace the previously provided playing cards which the player designated to discard. On the other hand, if a poker hand with a payout equal to the payout associated with the selected predetermined game outcome cannot be obtained based on the playing cards the player designated to hold, then along with replacing any of the previously provided playing cards which the player designated to discard with the retained selected playing cards, the gaming device replaces via a suitable graphic presentation, one or more of the previously provided playing cards the player designated to hold with one or more of the retained selected playing cards.

It should be appreciated that in one embodiment, rather than utilizing one or more of the held playing cards which may be part of a poker hand with an associated payout equal to the payout associated with the selected predetermined game outcome, the gaming device utilizes one or more new playing cards in forming the final or complete hand of playing cards. That is, even if based on the previously provided playing card the gaming device can generate a final poker hand with an associated payout equal to the payout associated with the selected predetermined game outcome, the gaming device will employ one or more new, previously non-provided cards to form the final poker hand that is associated with a payout equal to the payout associated with the selected predetermined game outcome. For example, if the selected predetermined game outcome is an award associated with three cards of the same rank and the player is dealt and holds three queens, the gaming device may replace one or more of the held queens and provide the player with three different cards of the same rank.

Figure 5A:
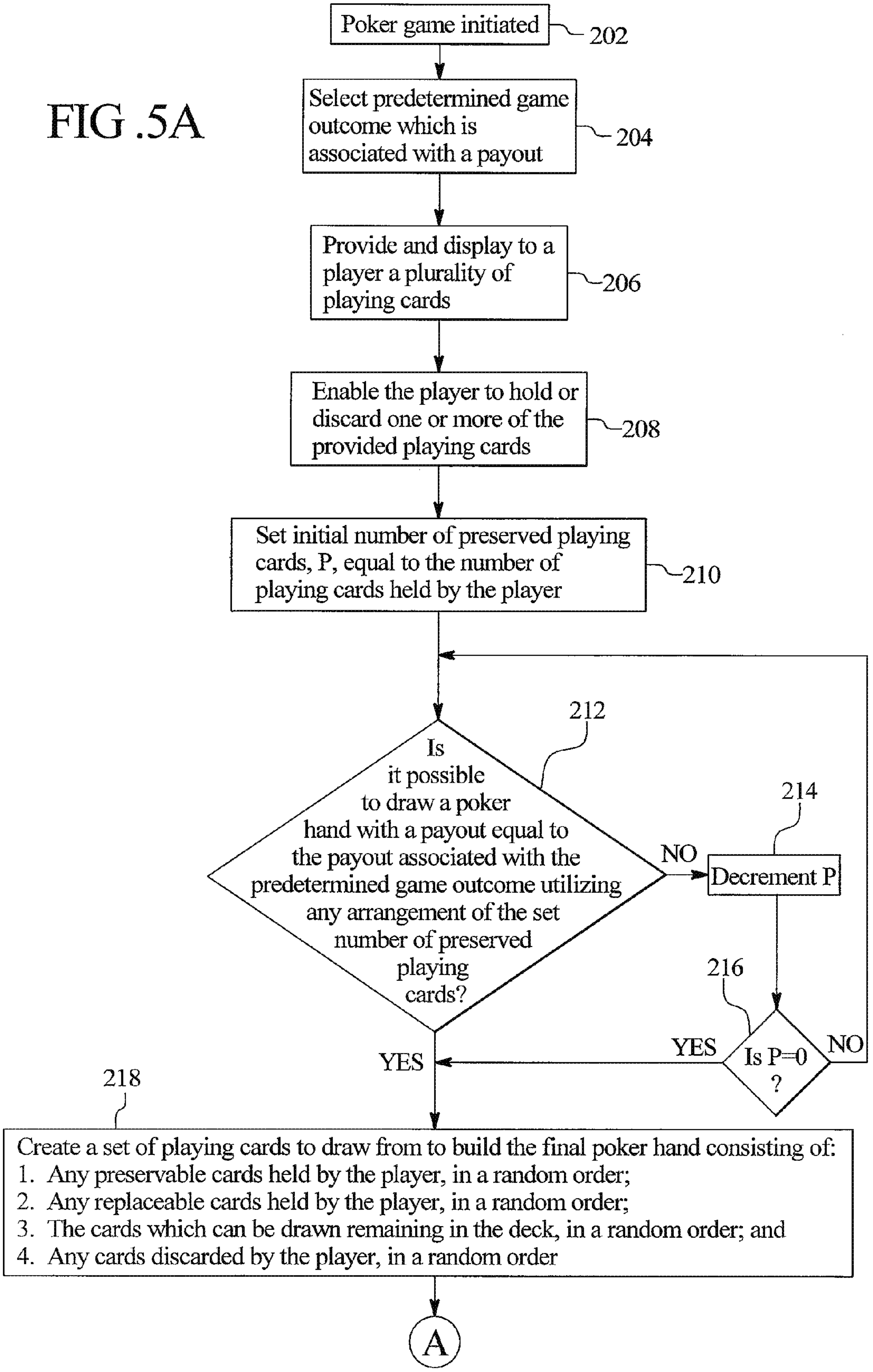
FIGS. 5A and 5B are schematic block diagrams illustrating an alternative embodiment of the present invention wherein a predetermined game outcome is selected and the selected predetermined game outcome is provided to the player via a poker game.
Figure 5B:
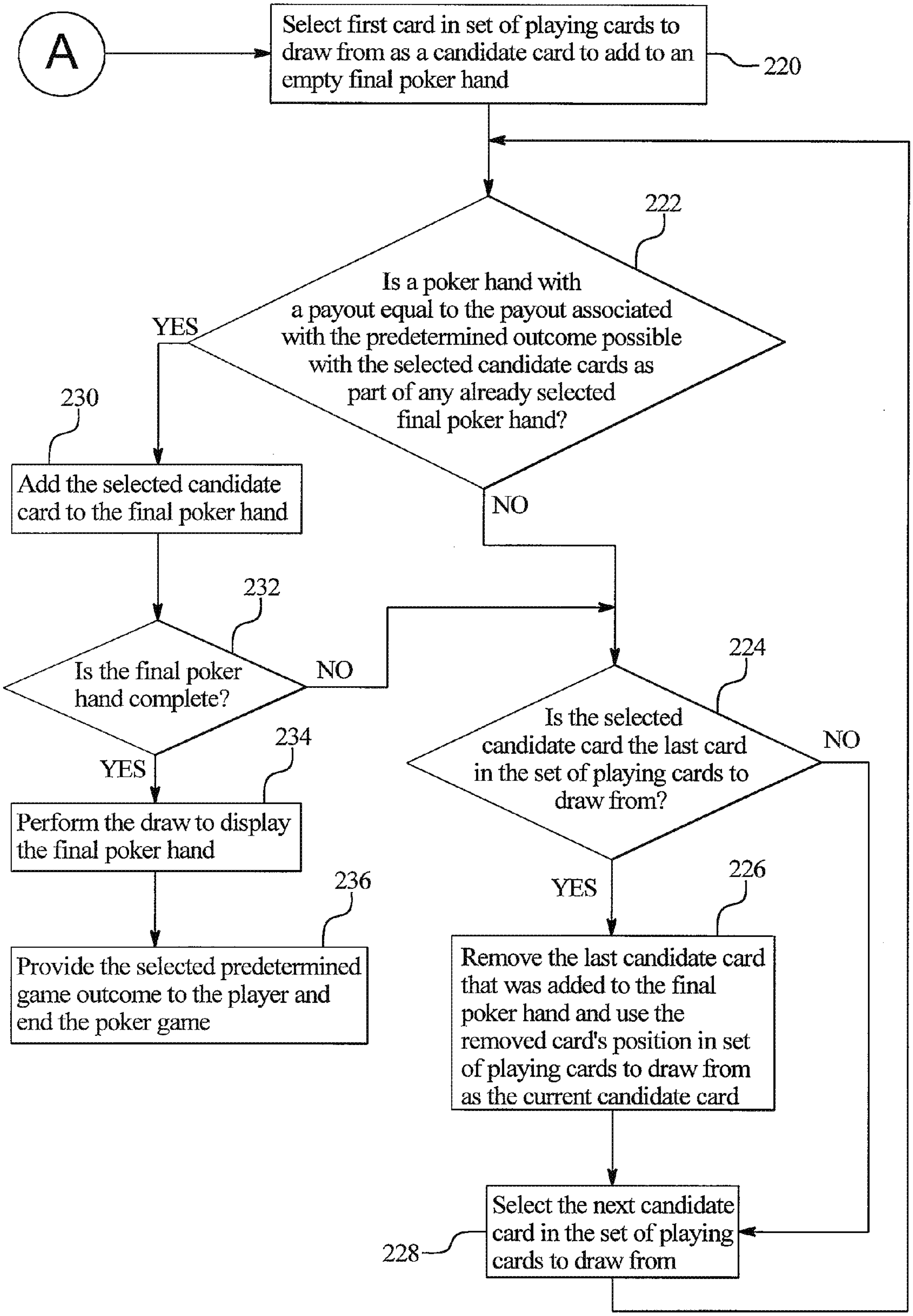

FIGS. 5A and 5B illustrate another embodiment of how the gaming device provides a poker game which provides a predetermined game outcome to a player. In this embodiment, as described above, upon the initiation of the poker game, a predetermined game outcome which is associated with a payout is selected and a plurality of playing cards are provided and displayed to a player as indicated in blocks 202, 204 and 206 of FIG. 5A.

The gaming device enables the player to hold or discard one or more of the provided playing cards as indicated in block 208 and described above. The gaming device then sets an initial number of preserved playing cards as indicated in block 210. The number of preserved playing cards is the number of playing cards held by the player which may be carried over into a second or final poker hand. In this embodiment, the initial number of preserved playing cards is initially equal to the number of playing cards held by the player. For example, if the player designated two cards to discard and three cards to hold, the initial number of preserved playing cards is set at three.

After setting the number of preserved playing cards, the gaming device determines if, utilizing any arrangement of the set number of preserved playing cards, it is possible to draw a poker hand with a payout equal to the payout associated with the predetermined game outcome as indicated in diamond 212. For example, if the initial number of preserved playing cards is set at three, the gaming device determines if, based on the three playing cards held by the player, the gaming device can draw two additional cards to form a poker hand with an associated payout equal to the payout associated with the predetermined game outcome.

If it is not possible to draw a poker hand with a payout equal to the payout associated with the predetermined game outcome utilizing any arrangement of the set number of preserved playing cards, the gaming device decreases the set number of preserved playing cards as indicated in block 214. The gaming device then determines if the revised number of preserved playing cards is equal to zero as indicated in diamond 216. If the revised number of preserved playing cards is not equal to zero, the gaming device returns to diamond 212 and determines if is possible to draw a poker hand with a payout equal to the payout associated with the predetermined game outcome utilizing any arrangement of the revised number of preserved playing cards. For example, if the revised number of preserved playing cards is two, the gaming device determines if, based on two out of the three playing cards held by the player, the gaming device can draw three additional cards to form a poker hand with an associated payout equal to the payout associated with the predetermined game outcome. It should be appreciated that by setting the initial number of preserved playing cards as the number of held playing cards and then decrementing the number of preserved playing cards if it is not possible to draw a poker hand with a payout equal to the payout associated with the predetermined game outcome utilizing any arrangement of the set number of preserved playing cards, the gaming device of this embodiment is attempting to utilize as many of the held playing cards as possible in the second or final poker hand which will be provided to the player.

If it is possible to draw a poker hand with a payout equal to the payout associated with the predetermined game outcome utilizing any arrangement of the current number of preserved playing cards or if the revised number of preserved playing cards is equal to zero, the gaming device creates a set of playing cards to draw from to build the final poker hand as indicated in block 218. It should be appreciated that if the revised number of preserved playing cards is equal to zero, then none of the held playing cards will be utilized in forming a final or second poker hand and each of the held playing cards will be replacement cards which will be replaced in the final or second poker hand as described above. In this embodiment, the created set of playing cards to draw from to build the final poker hand first includes, in a random order, any preservable cards held by the player (i.e., the held playing cards which will be utilized in forming a second or final poker hand). The set of playing cards to draw from next includes, in a random order, any replaceable cards held by the player (i.e., the held playing cards which will not be utilized in forming a second or final poker hand). The set of playing cards to draw from next includes, in a random order, the remaining playing cards in the deck (i.e., the playing cards not initially provided and displayed to the player). The set of playing cards to draw from finally includes, in a random order, the playing cards discarded by the player.

In one example, if the player held three playing cards and the gaming device determined that, based on the three playing cards held by the player, the gaming device can draw two additional cards to form a poker hand with an associated payout equal to the payout associated with the predetermined game outcome, then the three held playing cards are preservable cards and the gaming device creates a set of playing cards to draw from with the three preservable cards followed by the remaining, non-provided playing cards, followed by the playing cards discarded by the player. In this example, as the gaming device can utilize each of the three held playing cards, there are no replaceable cards. In another example, if the player held three playing cards and the gaming device determined that, based on two of the three playing cards held by the player, the gaming device can draw three additional cards to form a poker hand with an associated payout equal to the payout associated with the predetermined game outcome, then the two held playing cards which are determined to be part of the final poker hand are preservable cards and the third playing card which is determined not to be part of the final poker hand is a replaceable card. In this example, the gaming device creates a set of playing cards to draw from with the two preservable cards, followed by the one replaceable card, followed by the remaining, non-provided playing cards and followed by the playing cards discarded by the player.

Referring to FIG. 5B, after the gaming device creates the set of playing cards to draw from to build the final poker hand, the gaming device starts with an empty final poker hand and selects the first card from the set of playing cards to draw from as a candidate playing card to add to the final poker hand as indicated in block 220. The gaming device then determines if a poker hand with a payout equal to the payout associated with the predetermined outcome is possible with the selected candidate card as part of any already selected final poker hand as indicated in diamond 222. As described above, as the gaming device has previously created the set of playing cards to draw from in a designated order, the gaming device will build the final poker hand more efficiently by first selecting any preservable cards which are being held over from the initial poker hand and then determining any other playing cards which shall be included in the final poker hand.

If a poker hand with a payout equal to the payout associated with the predetermined outcome is not possible with the selected candidate card as part of any already selected final poker hand, the gaming device determines if the selected candidate card is the last card in the set of playing cards to draw from as indicated in diamond 224. If the selected candidate card is the last card in the set of playing cards to draw from, the gaming device removes the last candidate card that was added to the final poker hand and uses the removed card's position in the set of playing cards to draw from as the current candidate card as indicated in block 226.

If the selected candidate card is not the last card in the set of playing cards to draw from or the last candidate card was removed, the gaming device selects the next candidate card from the set of playing cards to draw from as indicated in block 228. The gaming device again determines if a poker hand with a payout equal to the payout associated with the predetermined outcome is possible with the selected candidate card as part of any already selected final poker hand as described above and indicated in diamond 222.

If a poker hand with a payout equal to the payout associated with the predetermined outcome is possible with the selected candidate card as part of any already selected final poker hand, the gaming device adds the selected candidate card to the final poker hand as indicated in block 230. The gaming device then determines if the final poker hand is complete as indicated in diamond 232. If the final poker hand is not complete, the gaming device determines if the selected candidate card is the last card in the set of playing cards to draw from as indicated in diamond 224 and as described above.

If the final poker hand is complete, the gaming device performs the draw to display the final poker hand to the player as indicated in block 234. As the payout associated with the final poker hand is equal to the payout associated with the predetermined game outcome, the gaming device provides the selected predetermined game outcome to the player and ends the poker game as indicated in block 236. It should be appreciated that the above illustrated operations of the backfill algorithm are examples of how to determine the appropriate playing cards to provide to the player and any suitable algorithm(s) which determine the appropriate playing cards to provide to the player may be employed with the present invention.

Figure 6A:
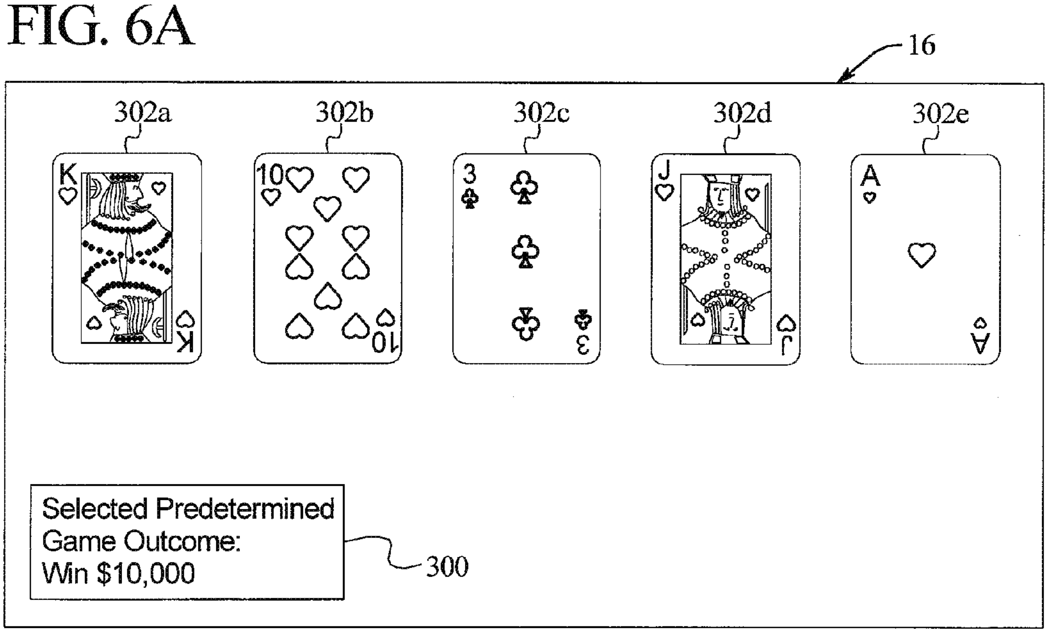
FIGS. 6A to 6E are top plan views of one embodiment of the present invention illustrating one poker game sequence wherein the gaming device utilizes a suitable algorithm to determine which playing cards to provide the player.

Referring now to FIGS. 6A to 6E, in one embodiment of the present invention, the gaming device provides a screen or display 16 wherein the player will play a poker game. As seen in FIG. 6A, upon the initiation of the poker game, a predetermined game outcome 300 of $10,000 is selected. With reference to an appropriate paytable (not shown), the selected predetermined game outcome of win $10,000 corresponds to the payout associated with a royal flush. It should be appreciated that during game play the selected predetermined outcome is not displayed to the player but is only displayed here for illustration purposes.

After the predetermined outcome is selected, the gaming provides a plurality or hand of playing cards to the player wherein one or more of the provided playing cards are based on the selected predetermined outcome. In this case, the provided playing cards are the ace of hearts, ten of hearts, three of clubs, jack of hearts and ace of hearts, 302*a*, 302*b*, 302*c*, 302*d* and 302*e*, respectively. The player's provided playing cards form an initial poker hand. One or more of the playing cards provided to the player are based on the selected game outcome. In this embodiment, upon selecting the predetermined game outcome, the gaming device determines according to an appropriate paytable which possible poker hands are associated with payouts that equal the payout associated with the selected game outcome. In one embodiment, the gaming device then provides one or more of the playing cards of one or more of the determined possible poker hands to the player. It should be appreciated that by basing one or more of the playing cards provided to the player on the selected game outcome, the gaming device of the present invention attempts to limit, subject to the player's decisions, the number of held playing cards which must be subsequently replaced with determined playing cards.

Figure 6B:
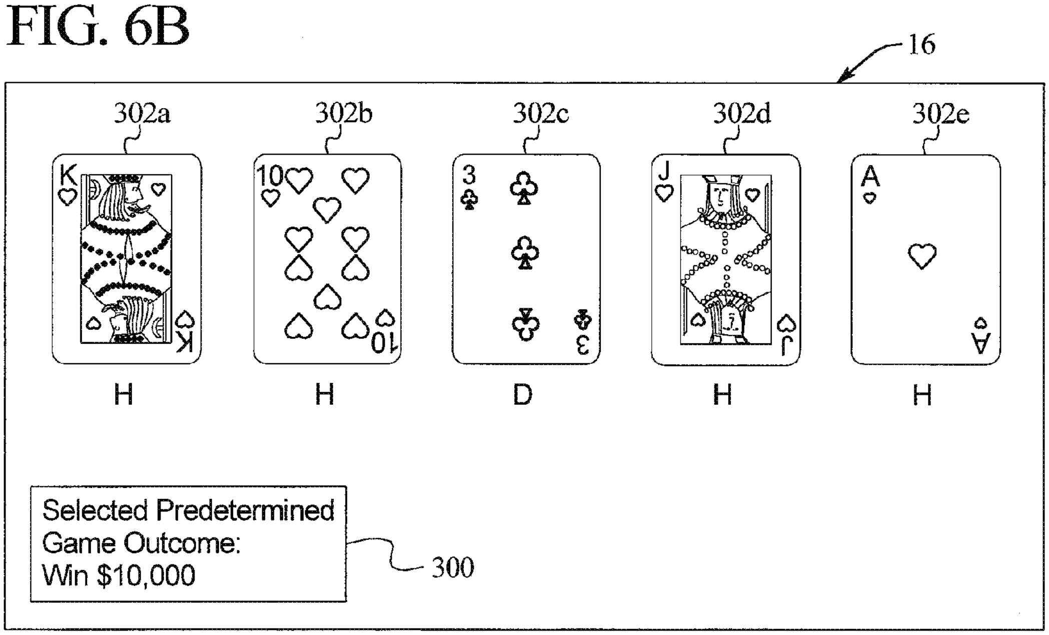

As illustrated in FIG. 6B, after each of the initial poker hands have been dealt to the player, the player is enabled to select or one or more of their initially dealt playing cards to hold or to discard. In this case, the player decided to hold the king of hearts 302*a*, ten of hearts 302*b*, jack of hearts 302*d* and ace of hearts 302*e* and discard the three of clubs 302*c*.

Figure 6C:
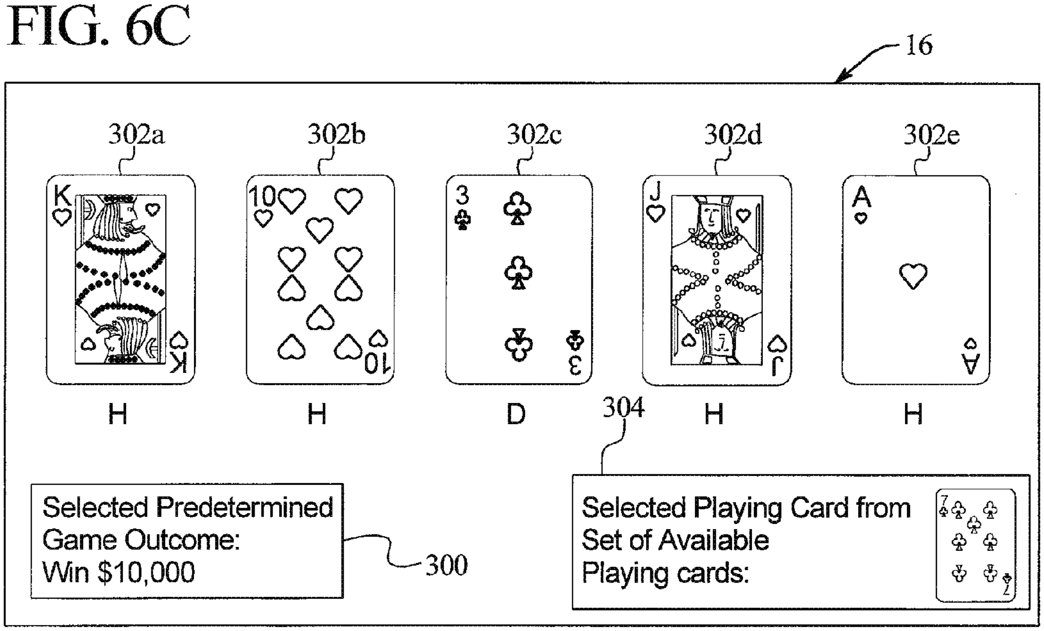

After the player selects each card to hold or discard, the gaming device determines that based on the held playing cards, a poker hand with an associated payout (i.e., a royal flush) equal to the payout associated with the selected game outcome (i.e., $10,000) is possible. Accordingly, as illustrated in FIG. 6C and as described above, the gaming device selects a first card from the available playing cards and determines whether the selected playing card should be retained. In this case, the first selected playing card is a seven of clubs 304. It should be appreciated that during game play each of the selected playing cards are not displayed to the player but are only displayed here for illustration purposes.

The gaming device determines that adding the seven of clubs to the set of held playing cards will not result in a royal flush poker hand. The gaming device removes the selected seven of clubs and selects the next available playing card. The gaming device continues selecting available playing cards and determining whether the poker hand of the held playing cards and the selected playing card is associated with a payout equal to the payout associated with the selected predetermined game outcome of $10,000.

Figure 6D:
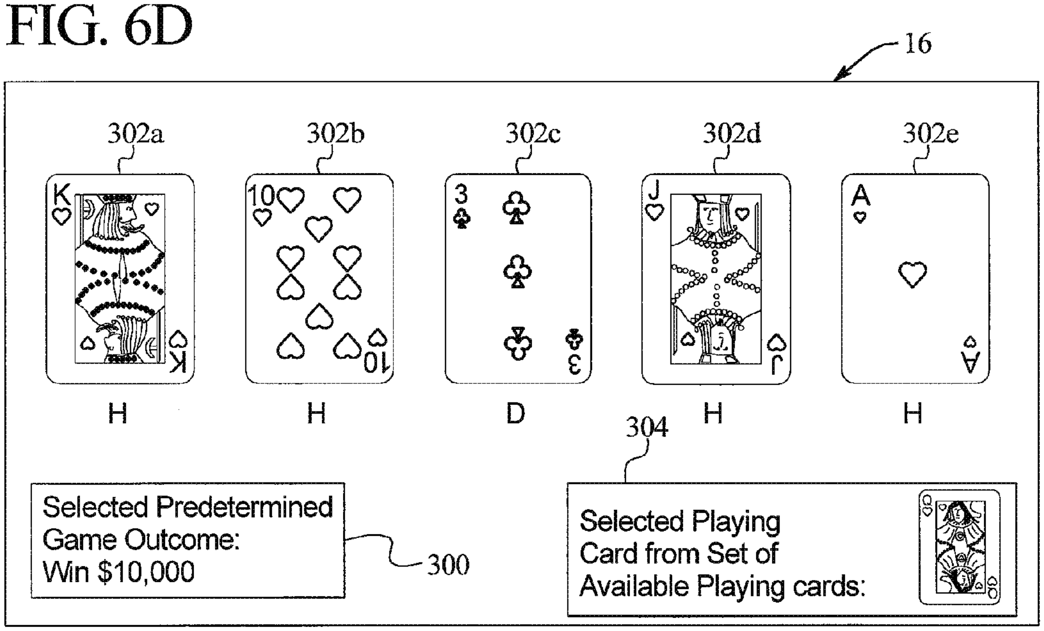

As illustrated in FIG. 6D, after one or more selected playing cards are removed, the gaming device selects the queen of hearts playing card 306. The gaming device determines that the poker hand of the held playing cards and the queen of hearts is associated with a payout equal to the payout associated with the selected predetermined game outcome of $10,000 and retains the selected queen of hearts.

Figure 6E:
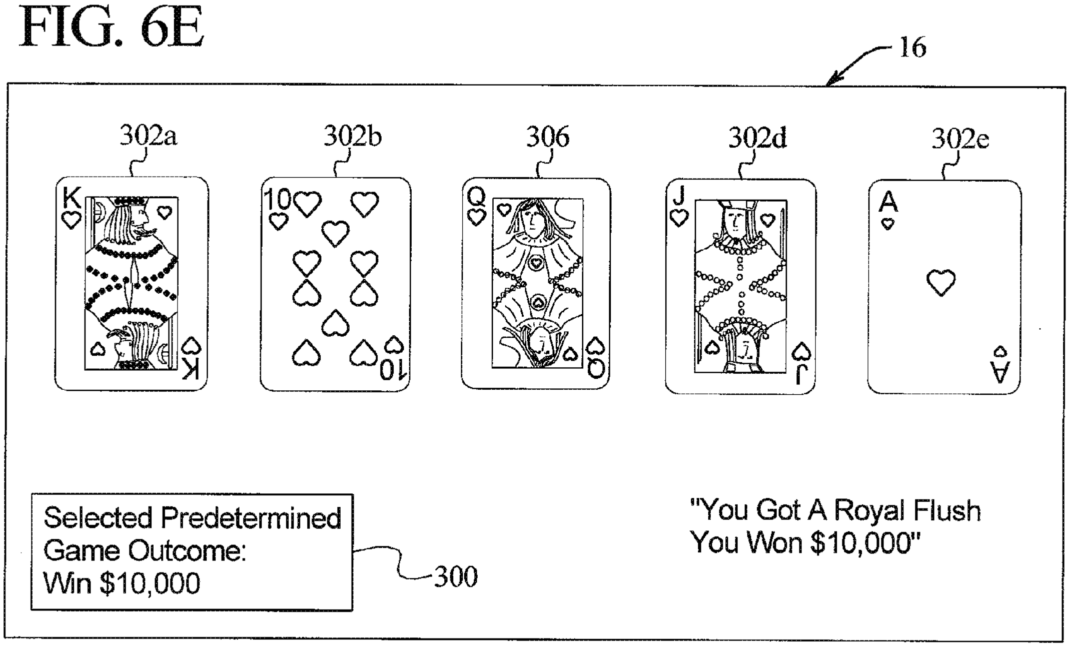

As illustrated in FIG. 6E, the retained selected queen of hearts 306 is provided to the player to replace the discarded three of clubs 302*c*. The held playing cards and the provided retained playing card form a final or second poker hand. The player is provided a payout based on the final or second poker hand and the poker game ends. It should be appreciated that the provided payout associated with the final poker hand equals the payout of $10,000 associated with the selected game outcome. It should be appreciated that if the selected predetermined game outcome is a lose game outcome, then based on the predetermined game outcome and which dealt playing cards the player decided to hold and which dealt playing cards the player decided to discard, the gaming device will utilize one or more backfill algorithms to determine which playing cards to provide to the player (i.e. to replace the discarded playing cards) that would insure that the player's final poker hand is associated with a payout of no value. As seen in FIG. 6D, appropriate messages such as "YOU GOT A ROYAL FLUSH" and "YOU WON $10,000" are preferably provided to the player visually, or through suitable audio or audiovisual displays.

Figure 7A:
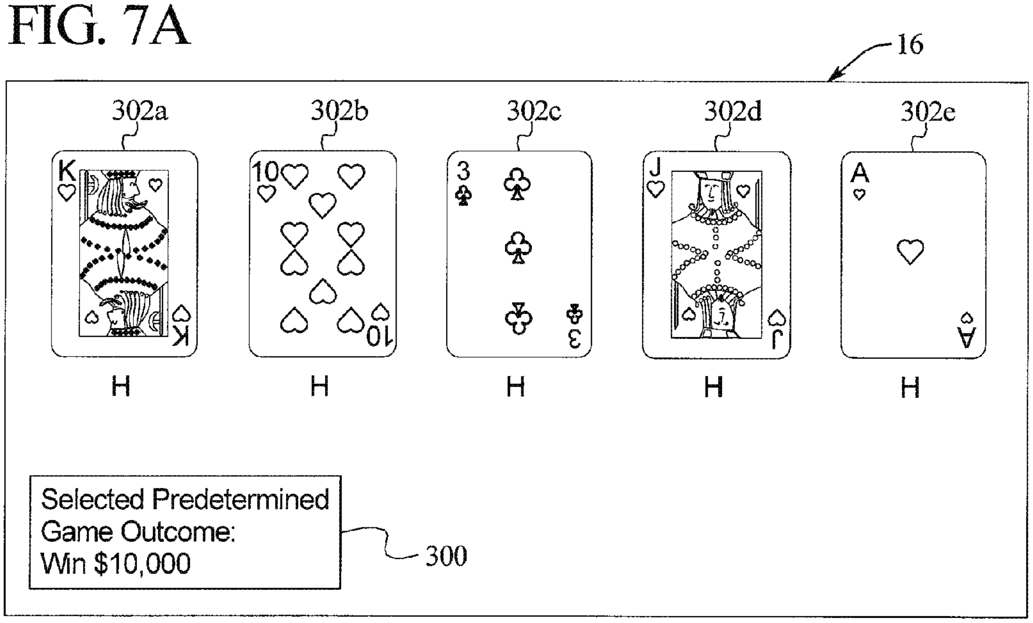
FIGS. 7A to 7D are top plan views of one embodiment of the present invention illustrating one poker game sequence wherein the gaming device utilizes a suitable algorithm to determine which playing cards to provide the player to replace a playing card designated as a hold by the player.
Figure 7B:
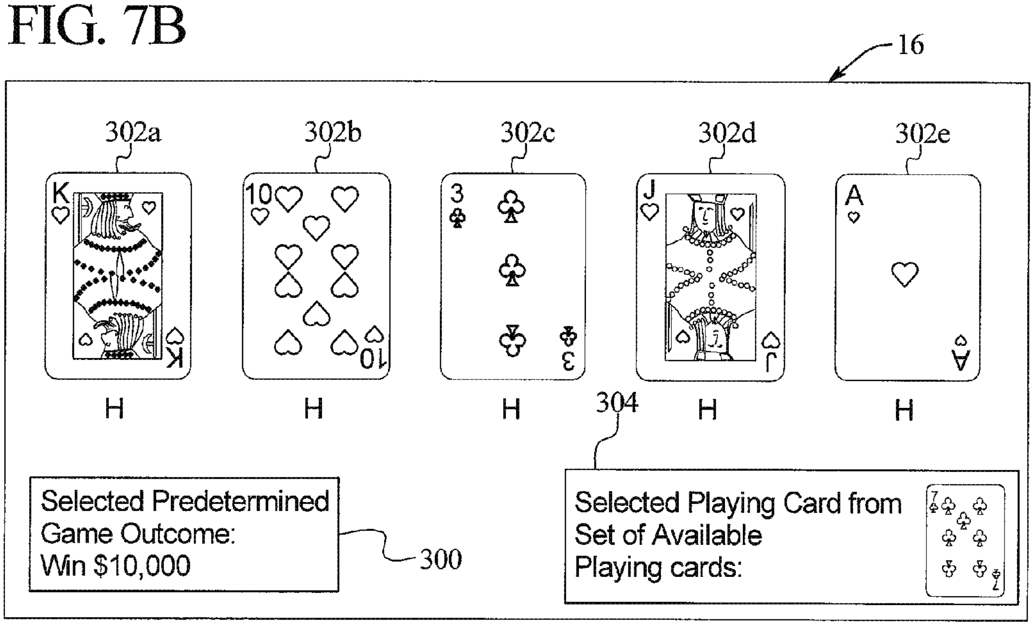
Figure 7C:
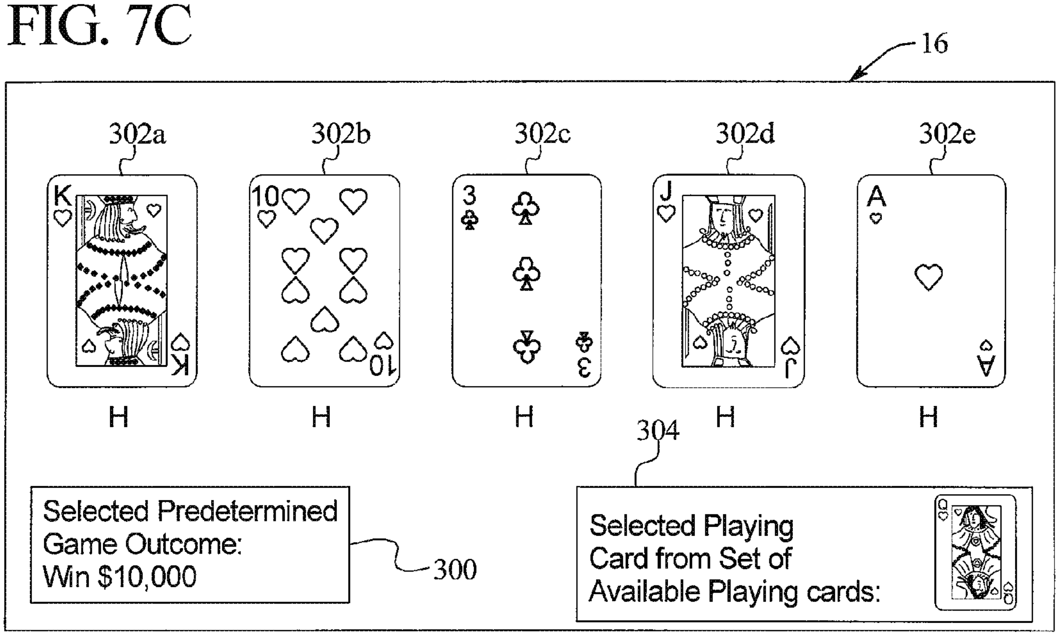
Figure 7D:
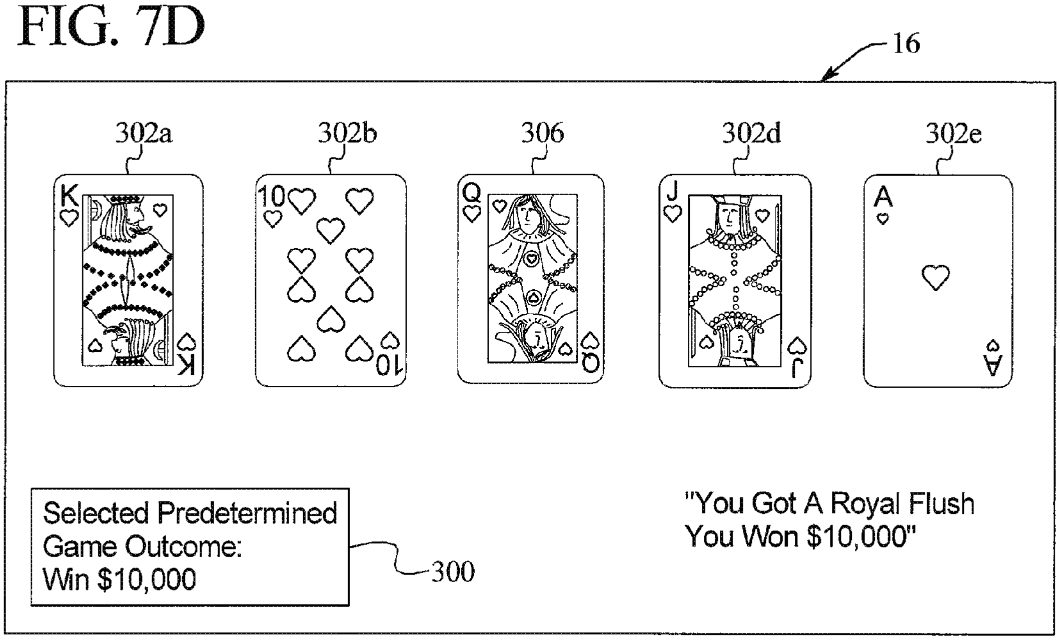

In another example, as illustrated in FIG. 7A, if the player decided to hold each of the initially dealt playing cards, then the gaming device would use a suitable algorithm to select a subset of each of the held playing cards except for the three of clubs. In this example, as described above and illustrated in FIGS. 7B and 7C, the gaming device proceeds selecting and removing available playing cards until retaining the queen of hearts. The gaming device then, via one or more graphic presentations, replaces the held three of clubs playing card with the retained queen of hearts and provides the player the selected predetermined game outcome, as illustrated in FIG. 7D.

In another embodiment, the gaming device is operable to initiate a replacement sequence of a playing card the player designated to hold even if the player is playing the poker game at an optimal poker strategy. If a final poker hand associated with a payout equal to the payout associated with the predetermined game outcome is provided to the player based on optimal game play and the player substantially plays the poker game according to the optimal poker strategy, the replacement sequence of one or more of the player's held playing cards would occur infrequently (i.e., only when the player makes a mistake and plays a hand at less than the optimal play strategy). Accordingly, the player may feel that the replacement sequence only occurs when they play their hand not at an optimal strategy. In this embodiment, the gaming device periodically provides a replacement sequence of one or more of the player's held playing cards, even though the player played the poker hand according to the optimal strategy. By replacing one or more of the player's held playing cards, even though the player is playing the poker game at an optimal strategy, the player becomes inured to the card replacement feature which forces the predetermined game outcome on the player.

While the present invention has been illustrated as a poker game with a single hand of cards, it should also be appreciated that any amount of hands of poker played simultaneously may be employed with the present invention. In one embodiment, the payouts associated with the outcomes from a plurality or each of the poker hands add up to the payout associated with the selected predetermined game outcome. In another embodiment, a predetermined game outcome is selected for each of the simultaneously played poker hands and the gaming device is operable to use one or more backfill algorithms to determine the necessary playing cards for each of the simultaneously played poker hands.

Moreover, while the present invention has been illustrated as a five card draw poker game, it should be appreciated that any type of poker game may be employed with the present invention. In addition to providing a five card draw poker game which provides one or more predetermined game outcomes to a player, the present invention may be employed with other suitable types of poker games, such as Texas Hold'em, as well as other suitable multi-player non-poker cards games, such as blackjack.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A gaming system comprising:

at least one input device;

at least one display device;

at least one processor; and at least one memory device which stores a plurality of instructions, which when executed by the at least one processor, cause the at least one processor to operate with the at least one display device and the at least one input device to:

(a) display a plurality of symbols from a set of symbols, wherein at least one of said displayed symbols is based on a predetermined game outcome value, and different pluralities of symbols from the set of symbols form a plurality of different symbol combinations that are each associated with a value;

(b) enable a player to select at least one of said displayed symbols to hold; and (c) if the player selected at least one of said displayed symbols to hold:

(i) determine whether one of said symbol combinations with an associated value equal to the predetermined game outcome value is obtainable based on the symbols the player selected to hold;

(ii) if one of said symbol combinations with an associated value equal to the predetermined game outcome value is obtainable based on the symbols the player selected to hold:

(A) determine, using a backfill algorithm, which of said symbols from the set of symbols need to be displayed with the symbols the player selected to hold to result in one of said symbol combinations with an associated value equal to the predetermined game outcome value, and (B) display a replacement of at least one of said symbols the player did not select to hold with at least one said determined symbols;

(iii) if one of said symbol combinations with an associated value equal to the predetermined game outcome value is not obtainable based on the symbols the player selected to hold:

(A) determine a subset of the symbols the player selected to hold, wherein said subset of symbols is based on the predetermined game outcome value, (B) determine, using the backfill algorithm, which of said symbols from the set of symbols need to be displayed with the determined subset of symbols the player selected to hold to result in one of said symbol combinations with an associated value equal to the predetermined game outcome value, (C) display a replacement of each of said symbols the player did not select to hold with one of said determined symbols, and (D) display a replacement of at least one of said symbols the player selected to hold which is not part of said determined subset of symbols with at least one of said determined symbols, and (iv) provide said predetermined game outcome value to the player.

2. The gaming system of claim 1, wherein when executed by the at least one processor, the plurality of instructions cause the at least one processor to operate with the at least one display device to randomly determine the order to display any determined symbols to the player.

3. The gaming system of claim 1, wherein the predetermined game outcome value is a progressive award value.

4. The gaming system of claim 1, wherein when executed by the at least one processor, the plurality of instructions cause the at least one processor to operate with the at least one input device to enable the player to select each of said displayed symbols to hold.

5. The gaming system of claim 1, wherein when executed by the at least one processor, the plurality of instructions cause the at least one processor to select said predetermined game outcome value from a plurality of predetermined game outcomes value.

6. The gaming system of claim 1, wherein when executed by the at least one processor, the plurality of instructions cause the at least one processor to operate with the at least one display device to randomly determine a set of determined symbols to display if a plurality of sets of symbols are each determined as needed to be displayed to result in one of said symbol combinations with an associated value equal to the predetermined game outcome value.

7. The gaming system of claim 1, wherein when executed by the at least one processor, a plurality of instructions associated with the backfill algorithm cause the at least one processor to:

(a) determine, from the set of symbols, an available set of symbols which have not been previously displayed to the player;

(b) select one of said available symbols from the determined set;

(c) add the selected symbol to at least one of the symbols the player selected to hold;

(d) determine whether one of said symbol combinations with an associated value equal to the associated with said predetermined game outcome value is obtainable based on the symbols the player selected to hold and the selected available symbol;

(e) if one of said symbol combinations with an associated value equal to the predetermined game outcome value is obtainable based on the symbols the player selected to hold and the selected available symbol, retain said selected symbol with the symbols the player selected to hold; and (f) if one of said symbol combinations with an associated value equal to the predetermined game outcome value is not obtainable based on the symbols the player selected to hold and the selected available symbol:

(i) remove the selected symbol from the symbols the player selected to hold, and (ii) repeat (b) to (f) until one available symbol is retained for each symbol the player selected to discard.

8. A gaming system comprising:

at least one input device;

at least one display device;

at least one processor; and at least one memory device which stores a plurality of instructions, which when executed by the at least one processor, cause the at least one processor to operate with the at least one display device and the at least one input device to:

(a) display a plurality of symbols from a set of symbols, wherein at least one of said displayed symbols is based on a predetermined game outcome value, and different pluralities of symbols from the set of symbols form a plurality of different symbol combinations that are each associated with a value;

(b) enable a player to select at least one of said displayed symbols to hold; and (c) if the player selected at least one of said displayed symbols to hold:

(i) determine a set of zero, one or a plurality of the held symbols for which one of said symbol combinations with an associated value equal to the predetermined game outcome value is obtainable;

(ii) determine which of said symbols from the set of symbols need to be displayed with the determined set of held symbols to result in one of said symbol combinations with an associated value equal to the predetermined game outcome value, wherein said determination is based on a backfill algorithm and said set of held symbols;

(iii) display a replacement of each of said symbols the player did not select to hold with one of said determined symbols;

(iv display a replacement of any of said held symbols which are not part of said determined set of held symbols with any of said determined symbols; and (v) provide said predetermined game outcome value to the player.

9. The gaming system of claim 8, wherein when executed by the at least one processor, the plurality of instructions cause the at least one processor to operate with the at least one display device to randomly determine the order to display any determined symbols to the player.

10. The gaming system of claim 8, wherein the predetermined game outcome value is a progressive award value.

11. The gaming system of claim 8, wherein when executed by the at least one processor, the plurality of instructions cause the at least one processor to operate with the at least one input device to enable the player to select each of said displayed symbols to hold.

12. The gaming system of claim 8, wherein when executed by the at least one processor, the plurality of instructions cause the at least one processor to select said predetermined game outcome value from a plurality of predetermined game outcome values.

13. The gaming system of claim 8, wherein when executed by the at least one processor, the plurality of instructions cause the at least one processor to operate with the at least one display device to randomly determine a set of determined symbols to display if a plurality of sets of symbols are each determined as needed to be displayed to result in one of said symbol combinations with an associated value equal to the predetermined game outcome value.

14. A gaming system comprising:

at least one input device;

at least one display device;

at least one processor; and at least one memory device which stores a plurality of instructions, which when executed by the at least one processor, cause the at least one processor to operate with the at least one display device and the at least one input device to:

(a) display a plurality of symbols from a set of symbols, wherein at least one of said displayed symbols is based on a predetermined game outcome value, and different pluralities of symbols from the set of symbols form a plurality of different symbol combinations that are each associated with a value;

(b) enable a player to select at least one of said displayed symbols to hold;

(c) thereafter, determine, using a backfill algorithm, which of any symbols from the set of symbols need to be displayed to result in one of said symbol combinations with an associated value equal to the predetermined game outcome value;

(d) display a replacement of any of said provided symbols with any of said determined symbols; and (e) provide said predetermined game outcome value to the player.

15. The gaming system of claim 14, wherein when executed by the at least one processor, the plurality of instructions cause the at least one processor to operate with the at least one display device to randomly determine the order to display any determined symbols to the player.

16. The gaming system of claim 14, wherein the predetermined game outcome value is a progressive award value.

17. The gaming system of claim 14, wherein when executed by the at least one processor, the plurality of instructions cause the at least one processor to operate with the at least one input device to enable the player to select each of said displayed symbols to hold or to discard.

18. The gaming system of claim 14, wherein when executed by the at least one processor, the plurality of instructions cause the at least one processor to select said predetermined game outcome value from a plurality of predetermined game outcome values.

19. The gaming system of claim 14, wherein when executed by the at least one processor, the plurality of instructions cause the at least one processor to operate with the at least one display device to randomly determine a set of determined symbols to display if a plurality of sets of symbols are each determined as needed to be displayed to result in one of said symbol combinations with an associated value equal to the predetermined game outcome value.

* * * * *